United States Patent
Thermond et al.

(10) Patent No.: US 7,277,409 B1
(45) Date of Patent: Oct. 2, 2007

(54) WIRELESS LOCAL AREA NETWORK MANAGEMENT

(75) Inventors: Jeffrey L. Thermond, Saratoga, CA (US); Edward H. Frank, Atherton, CA (US)

(73) Assignee: Broadcom Corporation, Irvine, CA (US)

( * ) Notice: Subject to any disclaimer, the term of this patent is extended or adjusted under 35 U.S.C. 154(b) by 1076 days.

(21) Appl. No.: 10/360,178

(22) Filed: Feb. 7, 2003

Related U.S. Application Data

(60) Provisional application No. 60/355,698, filed on Feb. 7, 2002.

(51) Int. Cl.
*H04Q 7/00* (2006.01)

(52) U.S. Cl. .................. 370/328; 370/331; 370/329; 370/235; 370/229; 370/254; 455/426.2; 455/41.2; 455/436

(58) Field of Classification Search ............. 370/328, 370/329, 331, 235, 254, 229
See application file for complete search history.

(56) References Cited

U.S. PATENT DOCUMENTS

| | | | |
|---|---|---|---|
| 6,522,650 B1 * | 2/2003 | Yonge et al. ............. | 370/390 |
| 6,542,460 B1 * | 4/2003 | Ring .......................... | 370/203 |
| 6,907,044 B1 * | 6/2005 | Yonge et al. ............... | 370/445 |
| 6,987,770 B1 * | 1/2006 | Yonge, III .................. | 370/401 |
| 7,016,325 B2 * | 3/2006 | Beasley et al. ............. | 370/331 |
| 7,023,798 B2 * | 4/2006 | Bourlas et al. ............. | 370/230 |
| 7,035,275 B2 * | 4/2006 | Liang ......................... | 370/436 |
| 7,095,754 B2 * | 8/2006 | Benveniste ................. | 370/465 |

* cited by examiner

*Primary Examiner*—Marceau Milord
(74) *Attorney, Agent, or Firm*—Garlick Harrison & Markison; Shayne X. Short

(57) ABSTRACT

Wireless local area network (WLAN) management. A novel approach is provided to associate various wireless stations (STAs) to the WLAN via appropriately selected Access Point (APs). In one implementation, a first AP services only those STAs that have functionality of a first user class (e.g., 802.11b functionality in one instance. In addition, a second AP services only those STAs that have functionality of a second user class (e.g., 802.11g functionality). The WLAN management ensures that STAs having similar characteristics (or similar functionality) are grouped together and associated with an AP that corresponds to those characteristics. For example, 802.11b STAs associate with the WLAN via an 802.11b AP. Analogously, 802.11g STAs associate with the WLAN via an 802.11g AP. When an 802.11g STA is unable to associate with the WLAN via an 802.11g AP, the STA may shift down its functionality set to 802.11b to successfully associate with the WLAN.

60 Claims, 15 Drawing Sheets

WLAN management method ad hoc WLAN communication system infrastructure / multiple Access Point (AP) WLAN communication system Wireless Local Area Network (WLAN) communication system AP/STA association management AP/STA association management examples of additional parameter(s) used in AP/STA management 1. capability of STAs
   a. 802.11b vs. 802.11g functionality
   b. data rates supported by STAs
   c. types of modulation used (Complementary Code Keying (CCK) vs. Orthogonal Frequency Division Multiplexing (OFDM))
2. list of valid users within WLAN vicinity
3. channel availability and allocation among APs
4. capability of APs
   a. 802.11b vs. 802.11g functionality
   a. data rates supported by APs
   c. types of modulation used (CCK vs. OFDM)
5. quality of wireless communication links between STAs and APs additional parameter(s) employed to govern AP/STA association management

Fig. 9

AP/STA association management

WLAN management method

WLAN management method

WLAN management method effective data rates using RTS/CTS (Request to Send/Clear to Send)

WIRELESS LOCAL AREA NETWORK MANAGEMENT

CROSS REFERENCE TO RELATED PATENTS/PATENT APPLICATIONS

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:
1. U.S. Provisional Patent Application Ser. No. 60/355,698, entitled "Wireless local area network management," filed Feb. 7, 2002 (Feb. 07, 2002), pending.

BACKGROUND OF THE INVENTION

1. Technical Field of the Invention

The invention relates generally to communication systems; and more particularly, it relates to managing and directing the links of communication between various devices within such communication systems.

2. Description of Related Art

Data communication systems have been under continual development for many years. One typical type of communication systems that has been receiving increased attention over the past several years are those involving Local Area Networks (LANs). One variant of a LAN is a Wireless LAN (WLAN). A WLAN employs wireless communication between the various devices within the WLAN. There has been a great deal of energy devoted to developing ways to improve the manner in which devices within WLANs interact. There has been a variety of directions in which this development energy has been directed. For example, some efforts are focused on the seeking to improve the type of signaling used between the various WLAN interactive devices. Other efforts have focused on the development on trying to minimize the complexity of the hardware included within the WLAN interactive devices while maintaining at least a minimum standard of performance. Some other avenues of development have sought to try to increase the overall throughput of the WLAN; this can be especially of concern when subscribers of the WLAN are seeking to access an external Wide Area Network (WAN), and the WLAN itself undesirably acts as a bottleneck to those subscribers. In addition, many other areas of development have also received attention in the past years.

More specifically referring to one avenue of development, the Institute of Electrical & Electronics Engineers (IEEE) 802.11 specification has been under continual development in an effort to try to improve the way in which WLANs operate. In this particular effort, there have been a number of revisions to the IEEE 802.11 specification draft, including the commonly known 802.11b specification and the newer revision to that draft, namely, the 802.11g specification draft. The 802.11g specification is backward compatible with the 802.11b specification, so that legacy devices within the WLAN can still interact with the WLAN, although probably using a reduced functionality set.

There are typically two manners in which to implement a WLAN: ad hoc (shown in FIG. 1) and infrastructure (shown in FIG. 2).

FIG. 1 is a system diagram illustrating a prior art ad hoc Wireless Local Area Network (WLAN). Referring to FIG. 1, the ad hoc implementation employs a number of WLAN interactive devices that is typically operable to communicate with each of the other WLAN interactive devices within the WLAN. There is oftentimes no structure to the network. In some instances, one of the WLAN interactive devices is designated as a master of the network and the other WLAN interactive devices operate as slaves to that master.

FIG. 2 is a system diagram illustrating a prior art infrastructure/multiple Access Point (AP) WLAN. Referring now to the FIG. 2, in the infrastructure (or multiple Access Point (AP)) implementation WLAN, a number of APs are employed to support communication with the WLAN interactive devices (which are sometimes referred to as wireless stations (STAs) in the infrastructure implementation). This infrastructure architecture uses fixed network APs with which the STAs can communicate. These network APs are sometimes connected to landlines (that may be connected to one or more WANs, as described above) to widen the LAN's capability by bridging wireless nodes to other wired nodes. If service areas overlap, handoffs can occur. This infrastructure structure may be implemented in a manner that is analogous to the present day cellular networks around the world.

Considering the development of the 802.11 specification and the subsequent generations and/or versions therein (e.g., 802.11b and 802.11g), there can sometimes be difficulty when various STAs and/or APs within the WLAN support both functionality sets. For example, there may be some instances where an AP or STA is only 802.11b operable. Alternatively, there may be some instances where an AP or STA is 802.11g operable; again, it is noted that the devices supporting the 802.11g functionality set are also typically backward compatible with the 802.11b functionality set. In one instance, when a 802.11g device associated a the WLAN via an 802.11b operable AP, then the full and improved functionality of the 802.11g specification, compared to the 802.11b specification, will not be fully capitalized. Moreover, it has found that the mixing of 802.11b and 802.11g devices within a single WLAN can severely reduce the overall throughput of the entire WLAN. As briefly mentioned above, this can be extremely problematic when STAs within the WLAN are using the WLAN to access an external WAN, such as the Internet. Even is a user has a fully operable 802.11g device, if that 802.11g user associates with the WLAN via an 802.11b operable AP, then that user will not capitalize fully on the 802.11g functionality of his/her device.

Moreover, the complexity and problems introduced by the mixing of 802.11b and 802.11g users within a WLAN becomes even more exacerbated given the fact that the 802.11b and 802.11g specifications employ two different modulation types. In the 2.4 GHz (Giga-Hertz) bands, there are two standards for modulation to achieve the various data rates. The older standard is 802.11b. It occupied three channels (of approximately 22 MHz (Mega-Hertz) spread) that are adjacent in the 2.4 GHz band. The 802.11b specification employs Complementary Code Keying (CCK) modulation; in contrast, the 802.11g specification employs Orthogonal Frequency Division Multiplexing (OFDM) modulation. Moreover, the newer 802.11g standard occupies the same band while using the OFDM modulation to achieve data rates approaching 54 Mbps (Mega bits per second). One of the many problems that may arise in this situation is that the 802.11b clients never expect to see OFDM modulation from the 802.11g uses in that particular channel. So if a mixed 802.11b and 802.11g community of users (which a mixed WLAN) starts transmitting in the same channels at the same time, then the performance of the WLAN will not be anywhere as near as good as if the community of users were homogenous as being all 802.11b or 802.11g users.

However, if an approach were made to allow only 802.11b (or only 802.11g) users within a WLAN, then the backward capability of the 802.11g users would be worthless and the 802.11b users could never interact within a WLAN where 802.11g was the chosen version of the 802.11 specification to be implemented. This represents a dilemma within the continued development of WLANs, in that, users of varied functionality devices may be implemented therein. The prior art does not present an adequate and efficient solution to address such deficiencies within WLAN implementation.

BRIEF SUMMARY OF THE INVENTION

Various aspects of the invention can be found in a Wireless Local Area Network (WLAN) management method. The method involves selecting a first user class of wireless stations (STAs) from among a plurality of STAs. The method also involves selecting a second user class of STAs from among the plurality of STAs. Each STA is within range of a first Access Point (AP) and a second AP within the WLAN. The method also involves denying STAs within the first user class of STAs from associating with a WLAN via the second AP as well as denying STAs within the second user class of STAs from associating with the WLAN via the first AP. Moreover, the method involves allowing STAs within the first user class of STAs to associate with the WLAN via the first AP using a first channel and allowing STAs within the second user class of STAs to associate with the WLAN via the second AP using a second channel.

In certain embodiment of the invention, the first user class of STAs includes Institute of Electrical & Electronics Engineers (IEEE) 802.11b specification operable STAs, and the second user class of STAs includes IEEE 802.11g specification operable STAs. There may be a finite number of channels employed by the APs to support the communication between the APs and the STAs within the WLAN. For example, the first channel may support communication with the WLAN between the first user class of STAs such that the first AP includes at least one channel 1 and channel 6 within the Institute of Electrical & Electronics Engineers (IEEE) 802.11 specification. Similarly, the second channel may support communication with the WLAN between the second user class of STAs such that the second AP includes channel 11 within the IEEE 802.11 specification.

There may also be APs of various types within the WLAN. One embodiment is implemented such that the first AP is an IEEE 802.11b specification operable AP, and the second AP is an IEEE 802.11g specification operable AP. The one or more STAs may be grouped together based on one or more communication channel parameters. For example, these one or more communication channel parameters may include any one or more of an IEEE 802.11b specification functionality, IEEE 802.11g specification functionality, a modulation type selected from Complementary Code Keying (CCK) and Orthogonal Frequency Division Multiplexing (OFDM), a data rate, and a quality of wireless communication link between the STAs and one or more of the APs.

There are a variety of manners in which the WLAN management method may be performed. In one embodiment, WLAN management application software is implemented to support the WLAN management method. For example, in one embodiment, the first AP and the second AP are communicatively coupled to a server that includes WLAN management application software that directs the denial and the association of STAs within the first class of STAs and the second class of STAs with the first AP and the second AP.

In another embodiment, the first AP and the second AP are communicatively coupled via a Distribution Service (DS) link. The first AP includes a first WLAN management application software, and the second AP includes a second WLAN management application software. The first WLAN management application software and the second WLAN management application software operate cooperatively to direct the denial and the association of STAs within the first class of STAs and the second class of STAs with the first AP and the second AP.

In yet another embodiment, the first AP and the second AP may be communicatively coupled via a Distribution Service (DS) link to which a server is also communicatively coupled. The first AP includes a first WLAN management application software, the second AP includes a second WLAN management application software, and the server includes a third WLAN management application software. The first WLAN management application software, the second WLAN management application software, and the third WLAN management application software all operate cooperatively to direct the denial and the association of STAs within the various classes of STAs with various classes of APs within the WLAN.

In some instances, the selection of one of the user classes of STAs automatically selects one of the other user classes of STAs. For example, the second user class of STAs may be automatically selected as being a remaining plurality of STAs within the plurality of STAs not selected during the selecting of the first user class of STAs from among the plurality of STAs.

The APs may beacon capability sets to the STAs within the WLAN. In the embodiment described herein, the first AP beacons capabilities of a first Basic Service Set (BSS) to each STA within the plurality of STAs. Similarly, the second AP beacons capabilities of a second BSS to each STA within the plurality of STAs, and the capabilities of the first BSS and the second BSS compose an Extended Service Set (ESS).

The method may also involve initially transmitting a first associate request from a STA within the plurality of STAs to the first AP when signal strength between the STA and the first AP is greater than signal strength between the STA and the second AP. The method may then also involve subsequently transmitting a second associate request from the STA to the second AP when the STA is denied association with the first AP. In some instances, the method also involves shifting down functionality of the STA when the STA is denied association with both the first AP and the second AP, and transmitting a third associate request from the STA to the first AP.

The method may involve communicating the association of the various APs with STAs within the WLAN. For example, the method may involve informing the second AP of the association when at least one STA within the first user class of STAs associates with the first AP, as well as informing the first AP of the association when at least one STA within the second user class of STAs associates with the second AP.

The WLAN may be communicatively coupled to a variety of other network types including a Wide Area Network (WAN). Examples of WANs may include the Internet, a microwave network, a satellite network, and/or another type of WAN.

Other embodiments of the invention may be found in various embodiments of WLAN communication systems that direct the permitting of association and the denial of association between the various STAs and the WLAN via the available APs within the WLAN.

BRIEF DESCRIPTION OF THE SEVERAL VIEWS OF THE DRAWINGS

FIG. 9 is a diagram illustrating an embodiment of some additional parameter(s) that may be used to govern AP/STA association management according to the invention.

DETAILED DESCRIPTION OF THE INVENTION

Figure 1:
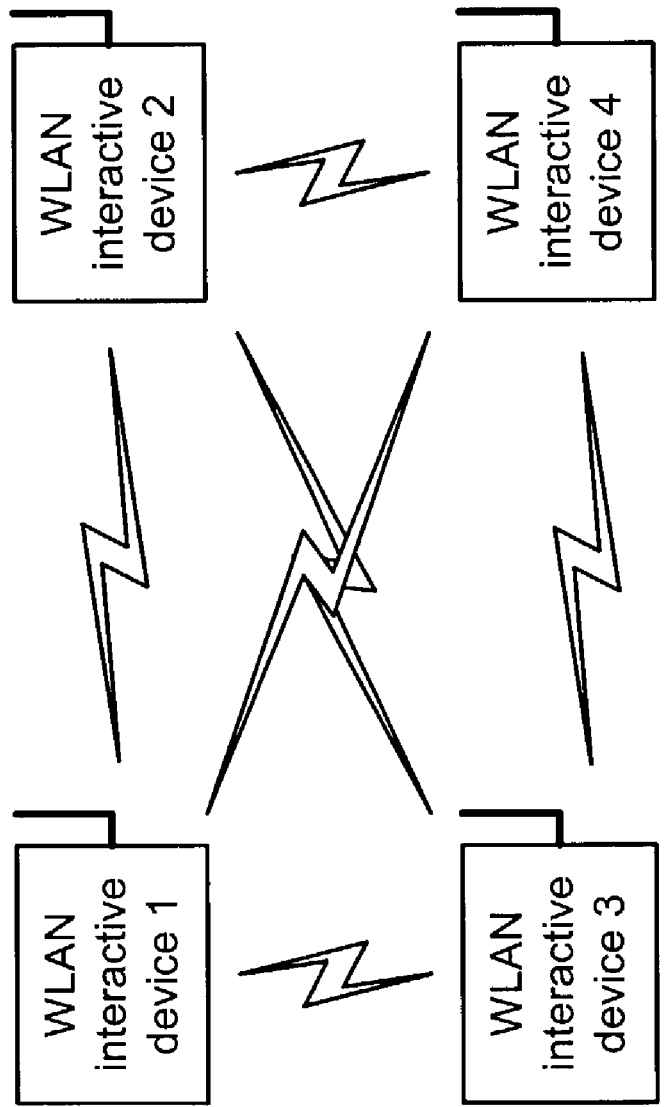
FIG. 1 is a system diagram illustrating a prior art ad hoc Wireless Local Area Network (WLAN).
Figure 2:
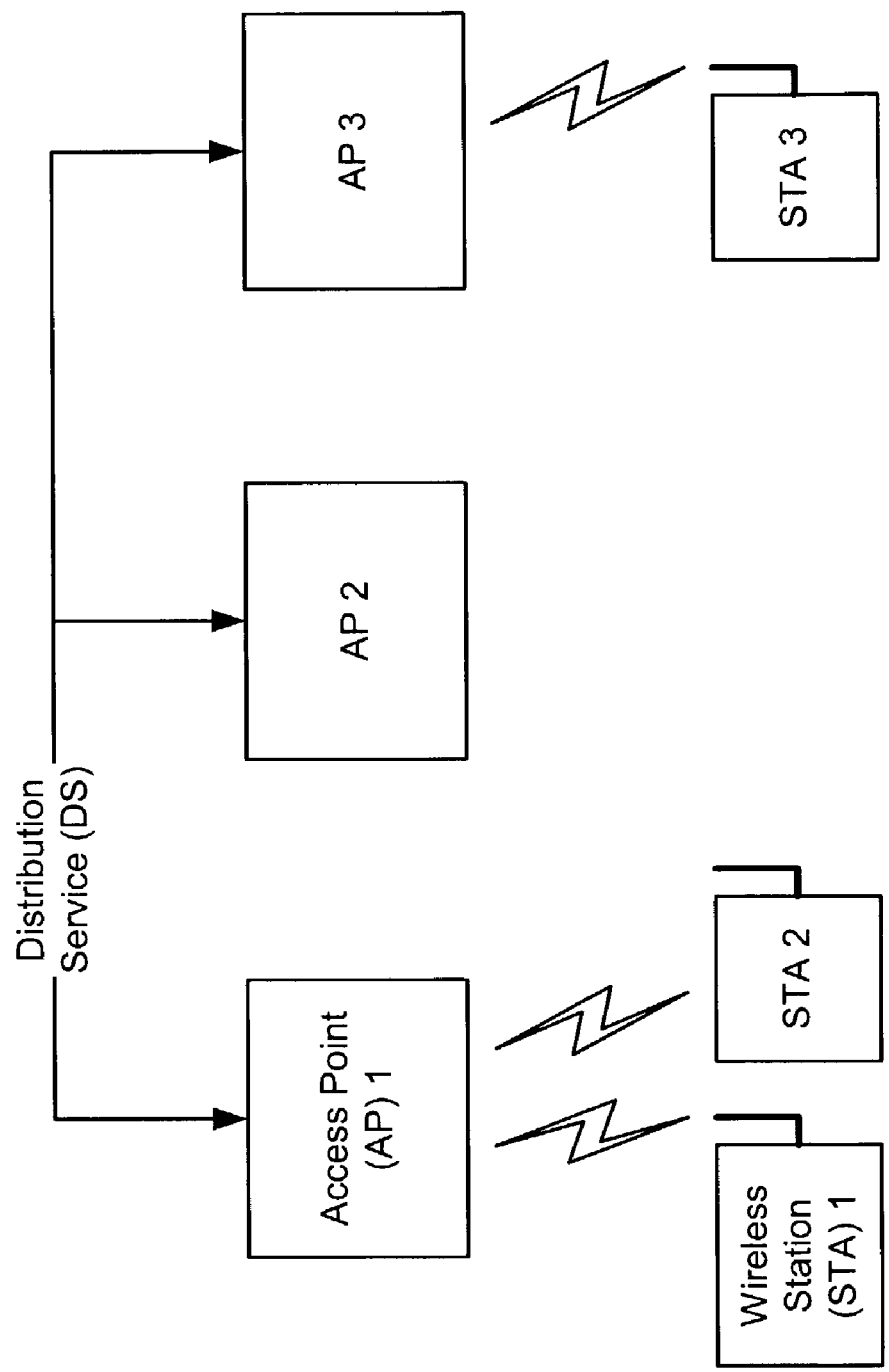
FIG. 2 is a system diagram illustrating a prior art infrastructure/multiple Access Point (AP) WLAN.

The invention presents a novel solution to associate like wireless stations (STAs) with Access Points (APs) within a Wireless Local Area Network (WLAN). A variety of parameters may be ascertained regarding the various STAs and APs within the WLAN including the functionality of those various devices as well as the quality of the various communication links connecting the STAs with the APs within the WLAN. There are a variety of manners in which the invention may be implemented. At a very minimum, those STAs having similar characteristics (or similar functionality) are grouped together and associated with an AP that corresponds to those characteristics.

These characteristics may include the communication functionality supported within the particular STA. For example, when a STA supports the Institute of Electrical & Electronics Engineers (IEEE) 802.11b specification governing WLAN communications, then that STA associates with an AP that similarly supports 802.11b. Alternatively, when a STA supports the IEEE 802.11g specification governing WLAN communications, then that STA associates with an AP that supports 802.11g. Typically, most 802.11g operable devices are also backward compatible to support 802.11b. In some instances, the STA that supports 802.11g may shift down its functionality so that it may associate with an 802.11b designated AP when an 802.11g designated AP may not be found. Similarly, when an AP is not associated with any STAs within the WLAN (e.g., the STA is 802.11g and many 802.11b STAs remain unassociated within the WLAN), then that 802.11g designated AP may shift down its functionality so that it may associate with those 802.11b STAs not yet being serviced.

From another perspective, in terms of modulation, the invention provides a solution such that users may be grouped such that those users that employ similar modulations are operate on the same channel. In one embodiment, no users employing different modulations will employ the same channel. By ensuring that a singe channel may have a single type of user, the overall performance of the WLAN is greatly enhanced. This is the central idea behind AgileLink (TM).

In one embodiment, when a wireless local area network (WLAN) station first boots up, the WLAN scans all of the available channels looking for an Access Point (AP) and then tries to associate with the AP that offers the strongest signal. In an example where the IEEE 802.11 specification is employed to operate the WLAN that uses channels 1, 6, and 11, then the WLAN scans all of the channels 1, 6, and 11 for an AP and then tries to associate with the AP that offers the strongest signal amongst those channels. AgileLink(TM) uses a Broadcom developed protocol for all access points within a common area to be aware of what types of user are on what channels. This capability, in and of itself, is extremely useful to network managers, and is also referred to in the EverLink(TM) preliminary disclosure.

However, according to the invention, Everlink(TM) need not be present, as the APs have the ability to communicate with each other (e.g., between APs) about which channel each of the other APs is using, and which types of users (e.g., which types of STAs) are on the channel. It is noted that this may be set up statically and/or off-line when the AP is configured in the first place.

In one implementation of AgileLink(TM), the APs act as they normally would in associating with users with one exception: in advance, one channel is selected to be used by one type of user. This group of users may be referred to as a minority user class and/or a first class of users. The remaining channels may be grouped into a group of users that may be referred to as a majority user class and/or a second class of users. As the IEEE 802.11g specification first rolls out, the decision may be made to have the 802.11g users to go to one and only one choice of the channels 1, 6, or 11. Later, when 802.11g is the predominant type, then the 802.11b only users will be in the minority and the rule will be applied to 802.11b users and not 802.11g. In other words, once the number of users of 802.11g surpasses the number of 802.11b users, then the classification of which group of users is the majority user class and the minority user class may be switched. In this embodiment that employs channels 1, 6, and 11, the minority user class (e.g., 802.11g initially and 802.11b later) may employ one of the channels; similarly, within this embodiment that employs channels 1, 6, and 11, the majority user class (e.g., 802.11b initially and 802.11g later) may employ the remaining two of the other channels.

Many embodiments are described in detail below. In any case, when a minority user (e.g., a minority type STA) initially tries to associate with the WLAN via an AP that is on a channel that is not authorized for that type of user, then the AP will deny the association, based on the network management rule. The user will then try to associate with the WLAN via another AP having the next best signal. Again, if the AP is on the non-authorized channel, then the user is similarly denied association. However, if the user is on the right channel, then the association with the WLAN will happen and everything will proceed as normal. This process may continue until the user finds the best signal on the appropriate channel.

Should a minority user who is 802.11g not find an access point which has an authorized channel, it will be the same to him as if he couldn't find any access point at all. Since reach is inversely proportionate to bandwidth, he will automatically shift down to a less complex modulation scheme. Eventually he will shift down into the modulation schemes used by 802.11b, at which point he will become a majority user and be able to associate with the closest (or strongest signal) possible access point.

Access points that are capable of either 802.11b or 802.11g which are assigned to channels where one or the other is forbidden will not turn on that type of modulation.

Figure 3:
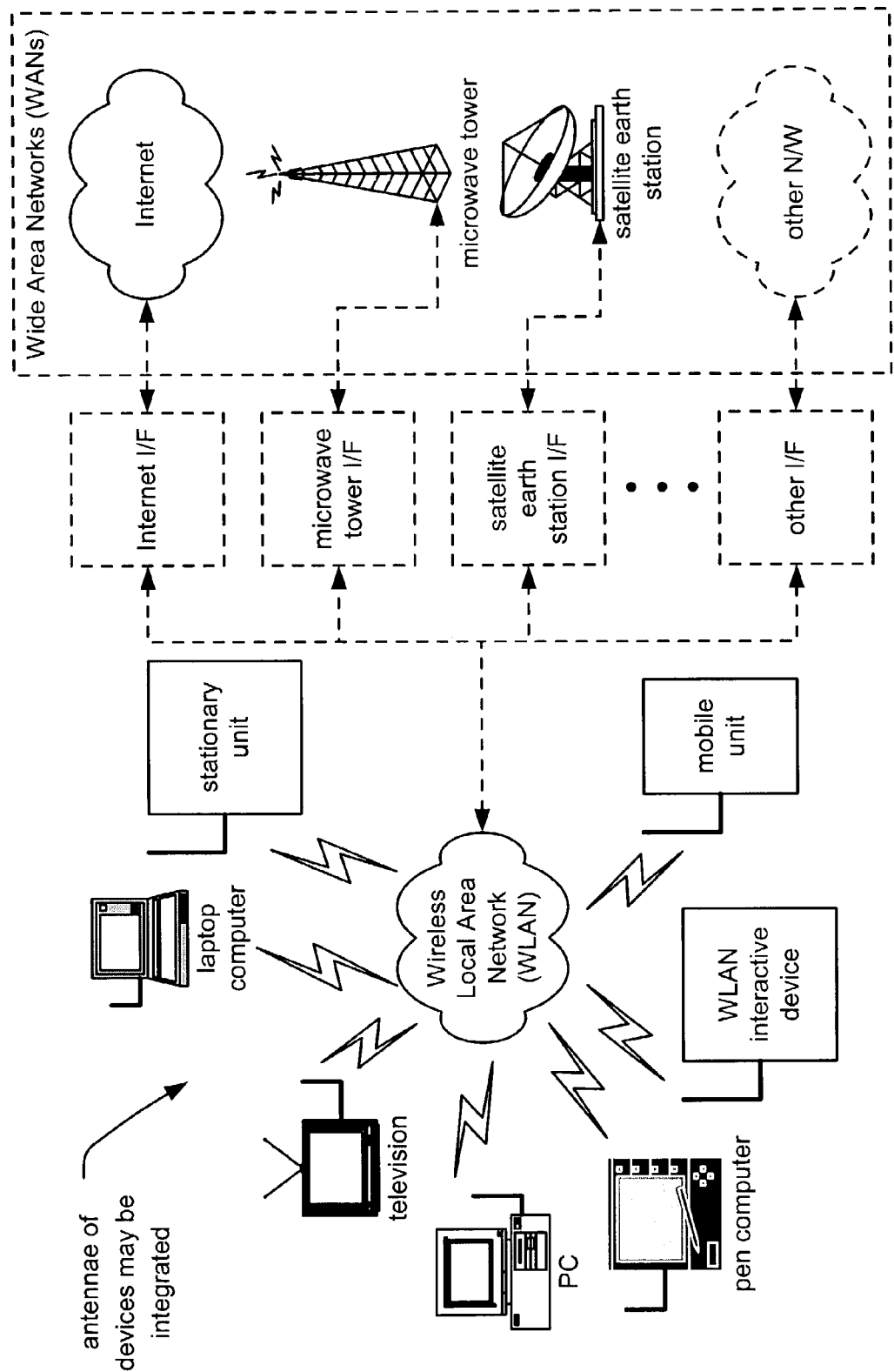
FIG. 3 is a system diagram illustrating an embodiment of a Wireless Local Area Network (WLAN) that is built according to the invention.

FIG. 3 is a system diagram illustrating an embodiment of a Wireless Local Area Network (WLAN) that is built according to the invention. The WLAN communication system includes a number of devices that are all operable to communicate with one another via a WLAN. For example, a number of devices that each include the functionality to interface with the WLAN may include a laptop computer, a television, a personal computer (PC), a pen computer (that may be viewed as being a personal digital assistant (PDA), a personal electronic planner, or similar device), a mobile unit (that may be viewed as being a telephone, a pager, or some other mobile WLAN operable device), and/or a stationary unit (that may be viewed as a device that typically resides in a single location).

The group of devices that may interact with the WLAN is not intended to be an exhaustive list of device that may interact with a WLAN, and a generic device shown as a WLAN interactive device represents a generic device that includes the functionality in order to interactive with the WLAN itself and/or the other devices that are associated with the WLAN. Any of these devices that associate with the WLAN may be viewed generically as being the WLAN interactive device without departing from the scope and spirit of the invention. Each of the devices and the WLAN interactive device may be viewed as being locates at nodes of the WLAN.

It is also noted that the WLAN itself includes functionality to allow interfacing with other networks as well. These external networks may generically be referred to s Wide Area Network (WANs). For example, the WLAN may include an Internet interface that allows for interfacing to the Internet itself. This Internet interface may be viewed as being a base station device for the WLAN that allows any one of the WLAN interactive devices to access the Internet.

It is also noted that the WLAN may also include functionality to allow interfacing with other networks, such as other WANS, besides the Internet. For example, the WLAN may include a microwave tower interface that allows for interfacing to a microwave tower thereby allowing communication with one or more microwave networks. Similar to the Internet interface, the microwave tower interface may be viewed as being a base station device for the WLAN that allows any one of the WLAN interactive devices to access the one or more microwave networks via the microwave tower.

Moreover, the WLAN may include a satellite earth station interface that allows for interfacing to a satellite earth station thereby allowing communication with one or more satellite networks. The satellite earth station interface may be viewed as being a base station device for the WLAN that allows any one of the WLAN interactive devices to access the one or more satellite networks via the satellite earth station interface.

This finite listing of various network types that may interface to the WLAN is not intended to be exhaustive. For example, any other network may communicatively couple to the WLAN via an appropriate interface that includes the functionality for any one of the WLAN interactive devices to access the other network.

The various WLAN interactive devices all associated with the WLAN using the WLAN management approach presented here according to the invention. Those WLAN interactive devices that operate according to a group of one of more parameters of a first class may associate with the WLAN via an appropriately selected AP. By maintaining like WLAN interactive devices to associate with the WLAN via the same channel via appropriately selected APs, the overall throughput of the WLAN may be greatly improved.

Figure 4:
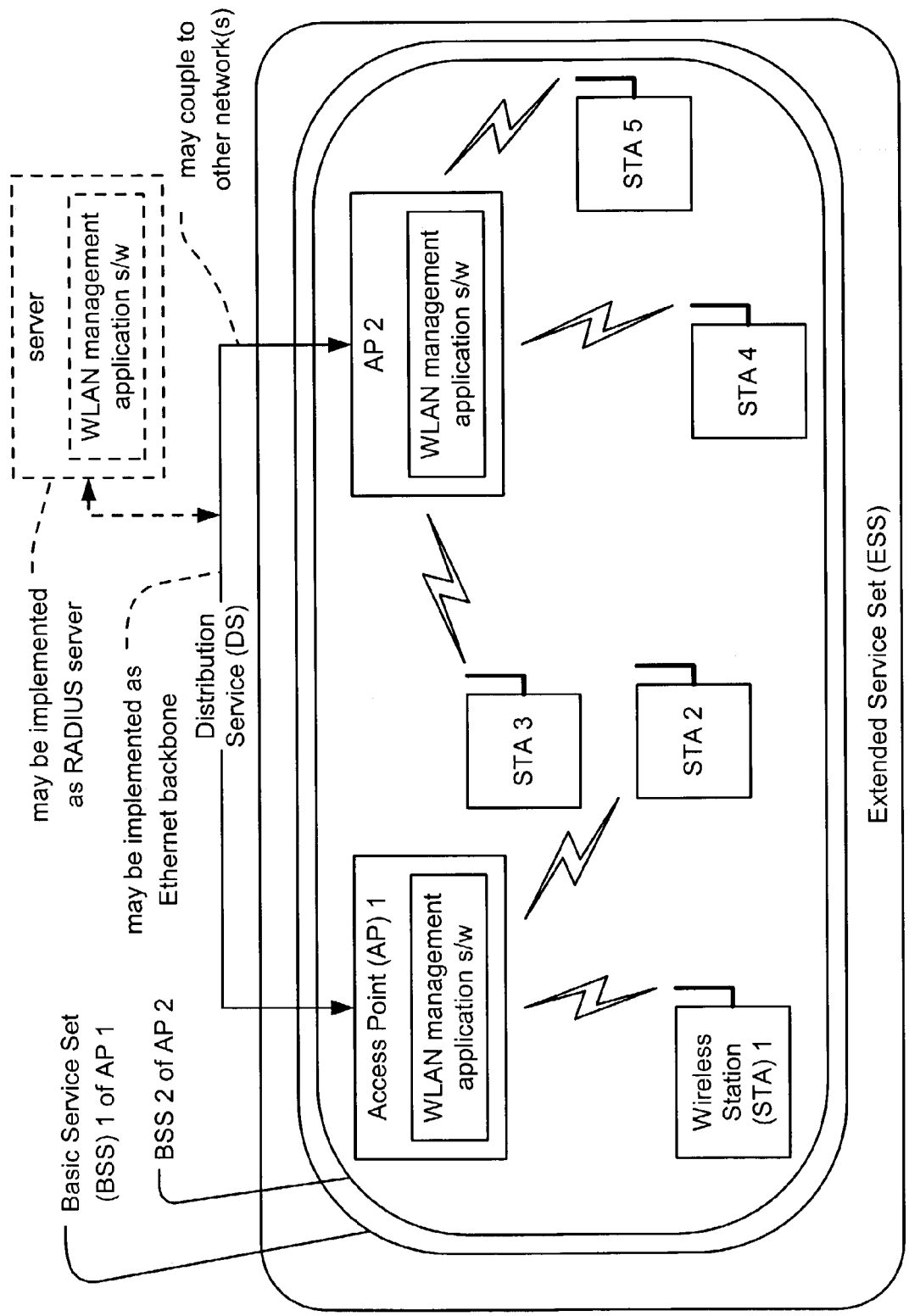
FIG. 4 is a system diagram illustrating an embodiment of as infrastructure/multiple Access Point (AP) WLAN that is built according to the invention.

FIG. 4 is a system diagram illustrating an embodiment of an infrastructure/multiple Access Point (AP) WLAN that is built according to the invention. A plurality of wireless stations (STAs) is located within a region such all of the STA are within range of two or more Access Points (APs). While all of the STAs are in fact located within range of the two or more APs, the invention ensures association of STAs to the WLAN via one of the APs using an appropriately selected channel as to provide a more efficient overall WLAN implementation. Shown within this embodiment, two APs (an AP 1 and an AP 2) are communicatively coupled to one another via a Distribution Service (DS) link. This DS link may be implemented as an Ethernet backbone in some instances. The DS link may enable be implemented to enable any of the STAs, once associated with the WLAN via one of the APs, to communicatively couple to an external network such as a WAN (e.g., the Internet in one case).

Moreover, a server may also be implemented on the DS link. This DS link may be implemented as a RADIUS server. A RADIUS (Remote Authentication Dial-In User Server) is an authentication and accounting system that may be employed to ensure that only those valid STAs may actually associate with the WLAN via one of the APs. For example, when a STA tries to associate with the WLAN, a username and/or password may be required. This information may then be passed onto the RADIUS server, which will verify if the information is correct, and then authorize the STA to associate with the WLAN.

Each of the AP 1 and AP 2 beacons capabilities of their respective Basic Service Sets (BSSs) to each STA within the region of the WLAN; this may be viewed as being a first BSS and a second BSS. Cooperatively, the first BSS and the second BSS compose an Extended Service Set (ESS).

The WLAN management functionality to ensure that like STAs associate with the WLAN using the appropriate APs may be supported using WLAN management application software. This WLAN management application software may be implemented in a distributed manner such that each of the AP 1 and the AP 2 includes a portion of the WLAN management application software, and the AP 1 and the AP 2 communicate via the DS link.

Alternatively, the server that may be communicatively coupled to the DS link may include WLAN management application software to direct the permitting of association and the denial of association between the various STAs and the WLAN via the AP 1 and the AP 2. In yet another embodiment, WLAN application software may be implemented in a distributed manner between the AP 1, the AP 2, and the server such that all of the various portions of WLAN application management software operate cooperatively to direct the permitting of association and the denial of association between the various STAs and the WLAN via the AP 1 and the AP 2.

Figure 5A:
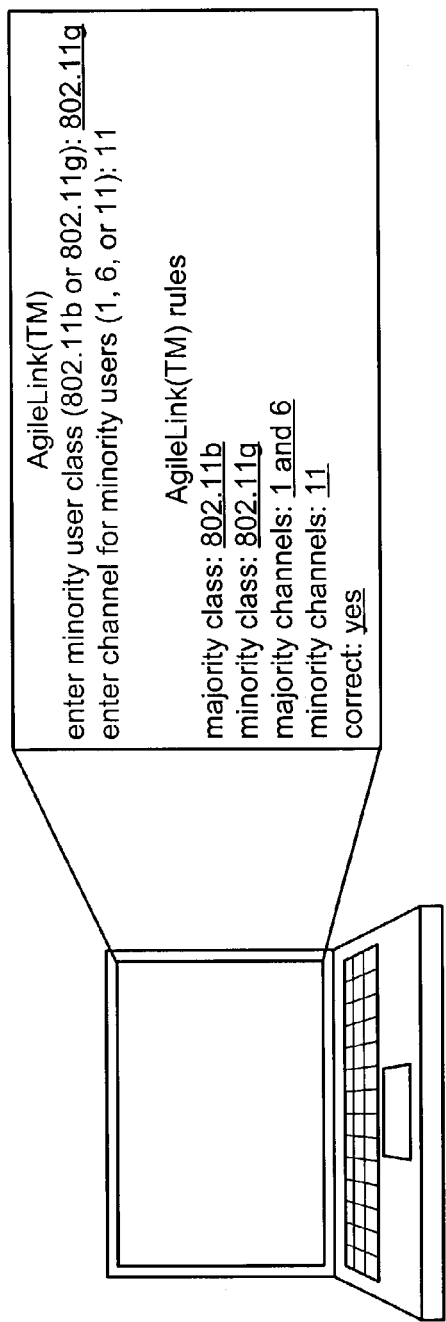
FIG. 5A and FIG. 5B are diagrams illustrating different embodiments of WLAN management input that is performed according to the invention.
Figure 5B:
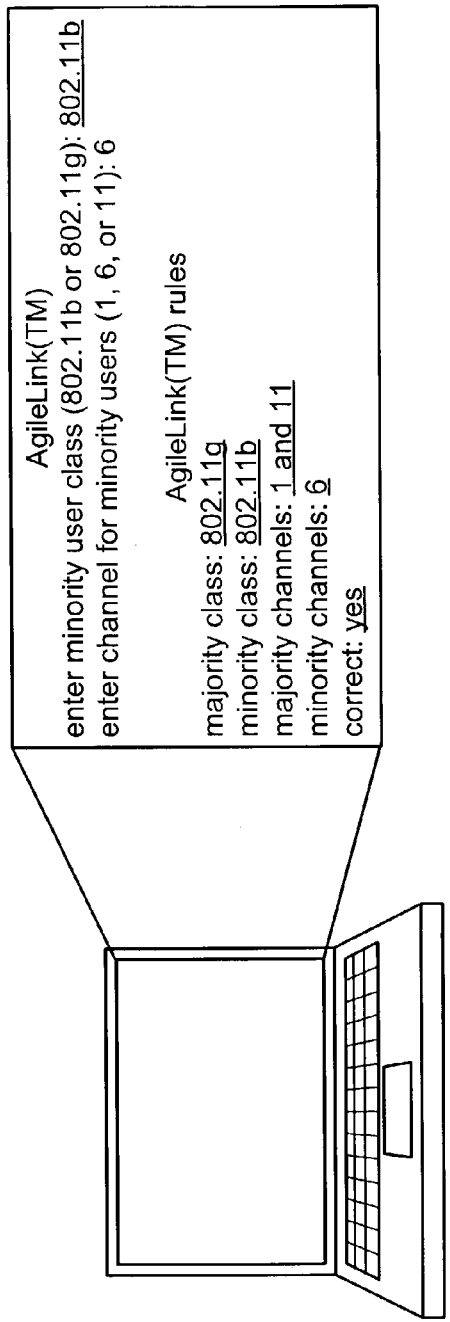

FIG. 5A and FIG. 5B are diagrams illustrating different embodiments of WLAN management input that is performed according to the invention. These embodiments are shown as being implemented using AgileLink(TM). A network manager or user of the WLAN may enter information that is used to direct the permitting of association and the denial of association between the various STAs and a WLAN via the various APs of the WLAN. Any type of man to machine interface may be employed to provide this information. A lap top computer is shown here in the FIG. 5A and the FIG. 5B, but it is noted that any device that allows the entering of information such that it may be used by the WLAN application management software may be used without departing from the scope and spirit of the invention. Again, the WLAN application management software may be implemented in a number of ways including be implemented in the APs and/or a server communicatively coupled to the APs.

Referring to the FIG. 5A, a minority user class is selected from among a number of user types. Shown herein, two user types include 802.11b and 802.11g user types, and the minority user type is selected as being 802.11b. This minority class may be viewed as being a first user class. Then, a channel is selected from among a number of available channels. Shown in this embodiment, channel 11 is shown as being selected from among the channels of 1, 6, and 11. After this user selected information has been made, then the AgileLink(TM) rules are shown below.

According to this implementation, the majority class is automatically selected as being 802.11b, since the user entered information above selects 802.11g as the minority user class. Similarly, the majority channels are automatically selected as being 1 and 6, since the user entered information above selects channel 11 as the minority channel.

Referring to the FIG. 5B, a minority user class is selected from among a number of user types. Shown here, two user types include 802.11b and 802.11g user types, and the minority user type is selected as being 802.11g. This minority class may be viewed as being a first user class. Then, a channel is selected from among a number of available channels. Shown in this embodiment, channel 6 is shown as being selected from among the available channels of 1, 6, and 11. After this user selected information has been made, then the AgileLink(TM) rules are shown below.

According to this implementation, the majority class is automatically selected as being 802.11g, since the user entered information above selects 802.11b as the minority user class. Similarly, the majority channels are automatically selected as being 1 and 11, since the user entered information above selects channel 6 as the minority channel.

Figure 6:
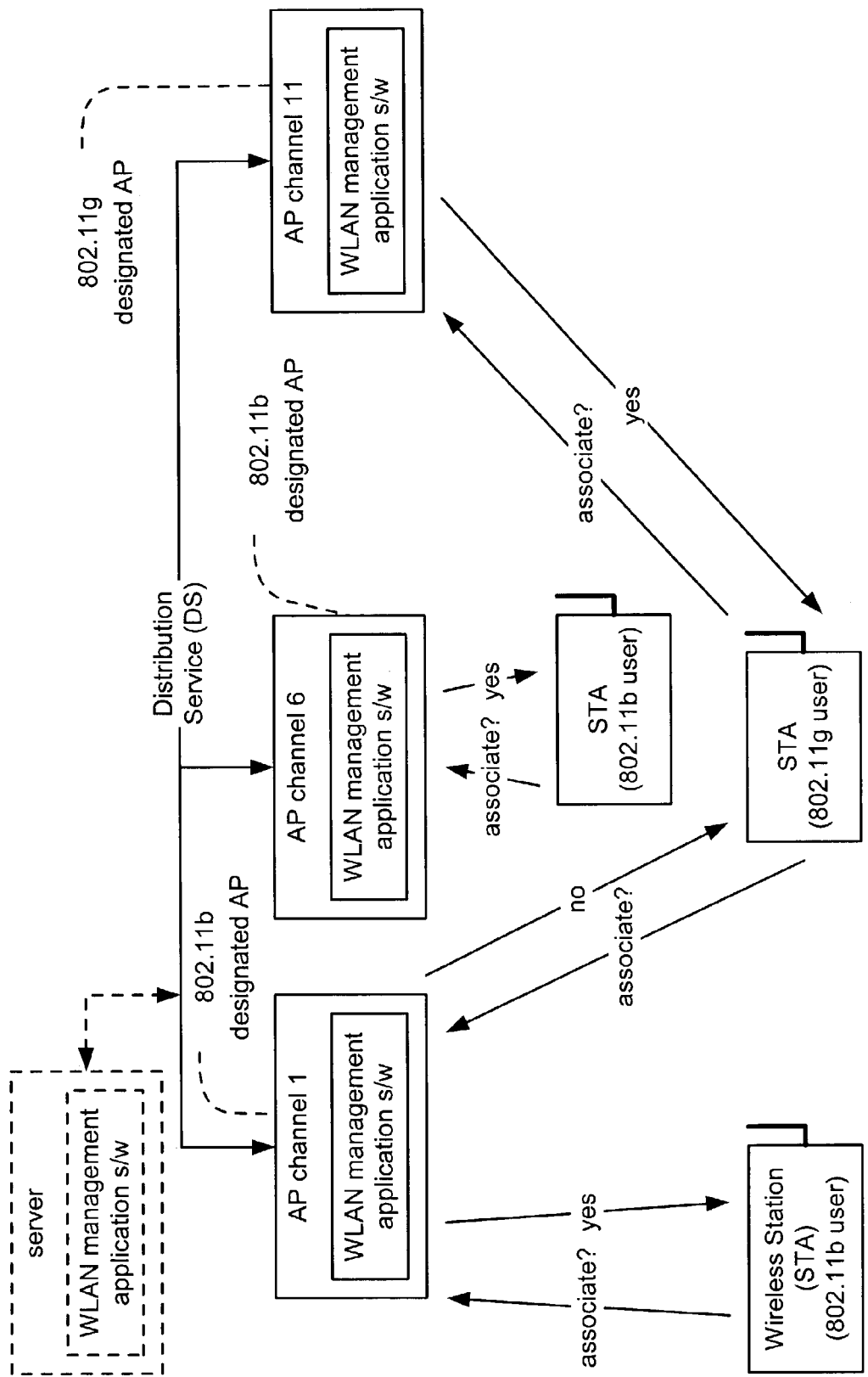
FIG. 6, FIG. 7, and FIG. 8 are diagrams illustrating different embodiments of AP/STA association management that may be performed according to the invention.
Figure 7:
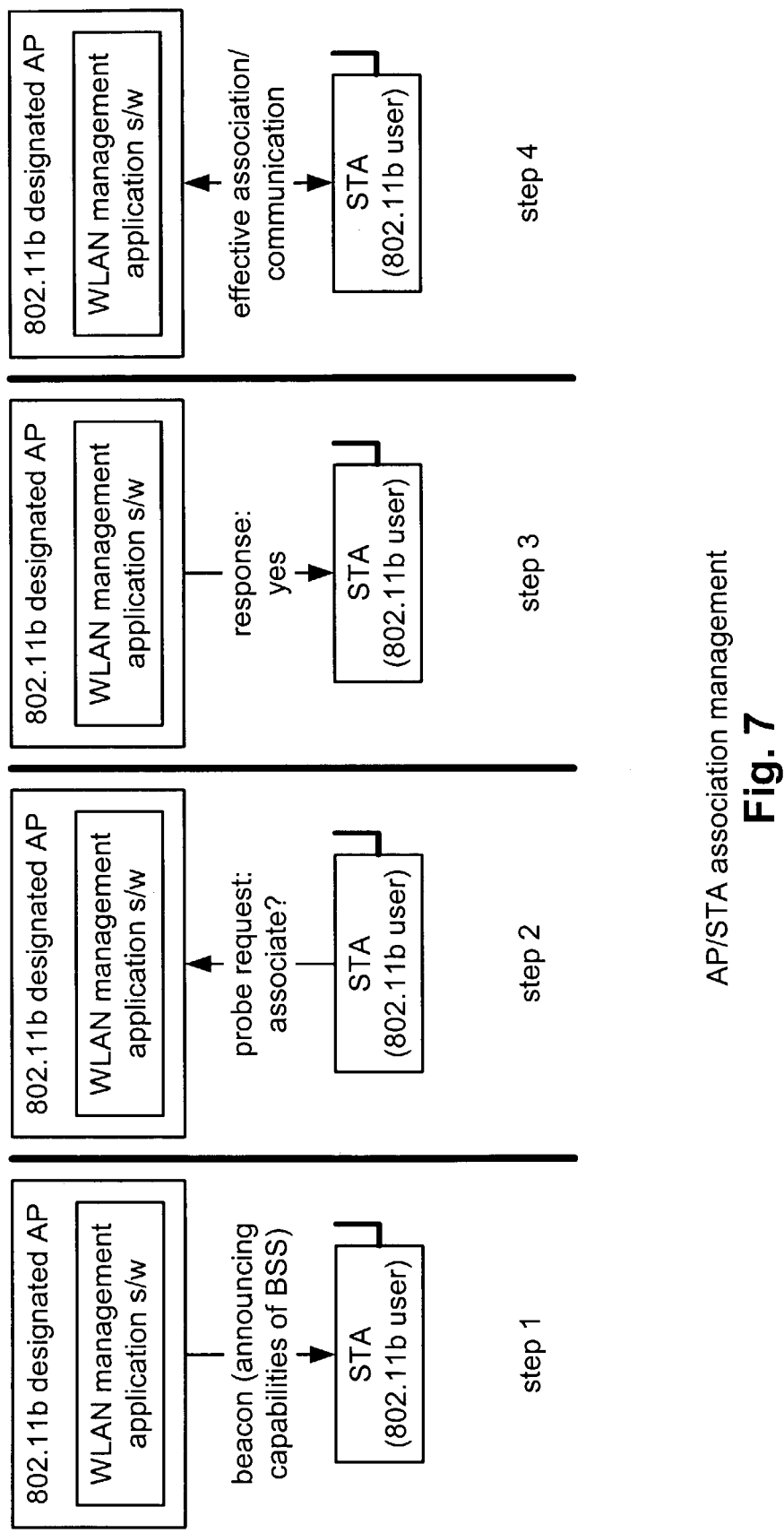
Figure 8:
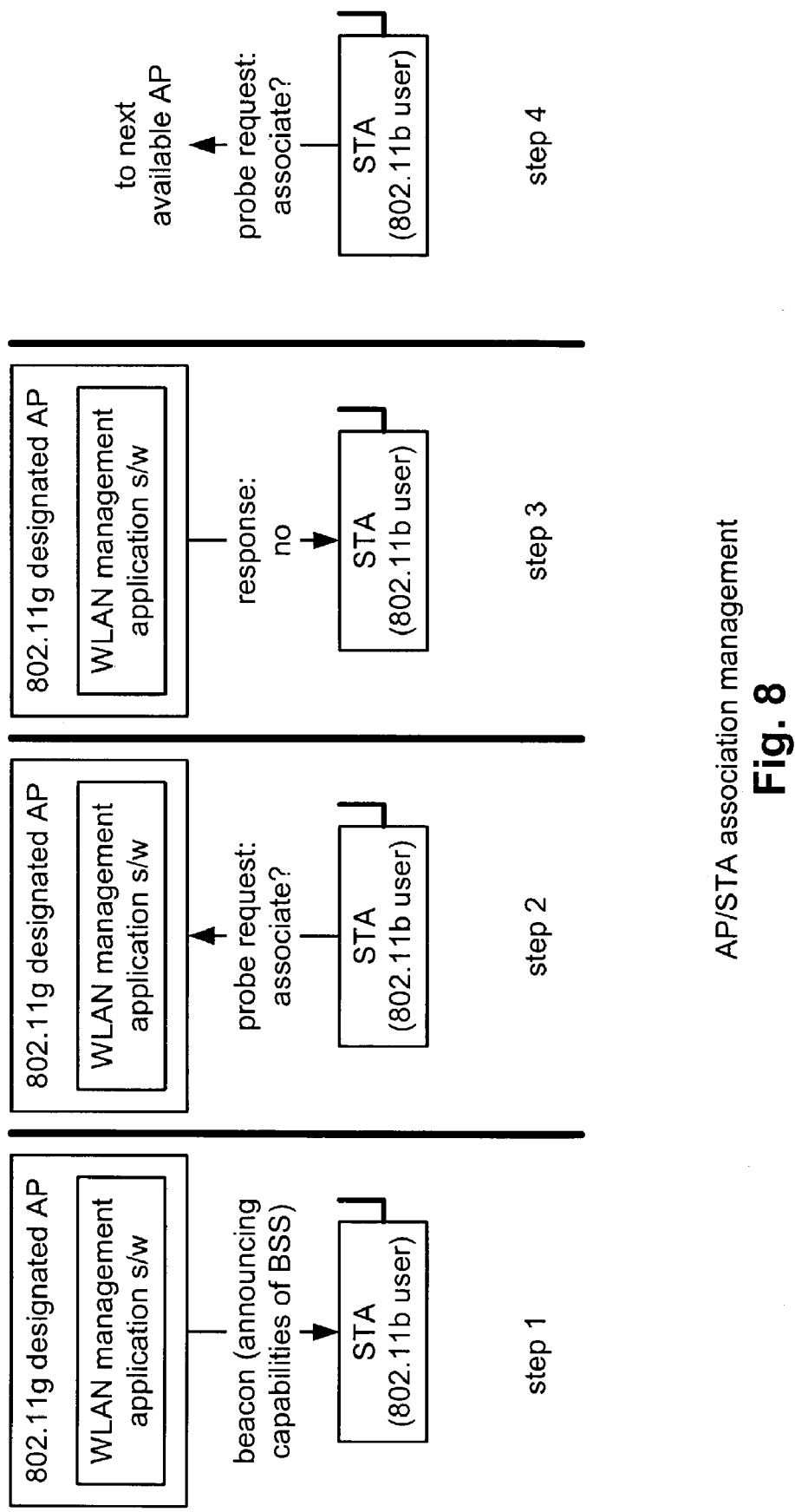

FIG. 6, FIG. 7, and FIG. 8 are diagrams illustrating different embodiments of AP/STA association management that may be performed according to the invention.

Referring to the FIG. 6, an implementation is shown as having 3 different APs. A first AP is designated to use channel 1 (AP channel 1). A second AP is designated to use channel 6 (AP channel 6), and a third AP is designated to use channel 11 (AP channel 11). As with some of the other embodiments illustrated above, WLAN management application software may be implemented in a distributed manner across the various APs. Alternatively, a server may also be communicatively coupled to the DS that communicatively couples the three APs. The WLAN management application software (whether implemented solely within the APs, solely within the server, or partially in the APs and partially in the server) may direct the permitting of association and the denial of association between the various STAs and the WLAN via these three APs (AP channel 1, AP channel 6, and AP channel 11). In addition, it is noted that one AP may be designated as a master AP on which the WLAN management application software may be implemented to direct the permitting of association and the denial of association between the various STAs and the WLAN via these three APs. Clearly, there are other manners as well in which the WLAN management application software may be arranged without departing from the scope and spirit of the invention. For example, the functionality illustrated herein by the WLAN management application software may be implemented in firmware, it may be hard wired, and/or it may be implemented using a state machine according to the invention. At a very minimum, the WLAN management application software is operable to direct the permitting of association and the denial of association between the various STAs and the WLAN via the APs that are part of the WLAN.

Specifically within the FIG. 6, a number of STAs are shown as trying to associate with the WLAN via one of the APs. For example, on the lower left hand side, an 802.11b user type STA tries to associate with the WLAN via the AP channel 1. This STA transmits an associate request to the AP channel 1, and since the AP channel 1 is an 802.11b designated AP, then a response of yes is transmitted back to the STA. This scenario illustrates a successful association request and permitting of association provided by the 802.11b designated AP.

Looking at another STA, the 802.11g user type STA in the lower middle of FIG. 6, this STA initially tries to associate with the WLAN via the AP channel 1. This STA transmits an associate request to the AP channel 1, but since the AP channel 1 is an 802.11b designated AP, then a response of no is transmitted back to the STA. This scenario illustrates an association request and denial of association provided by the 802.11b designated AP. After this failed association with the WLAN, this STA then transmits an associate request to the AP channel 11, and since the AP channel 11 is an 802.11g designated AP, then a response of yes is transmitted back to the STA. This scenario illustrates a successful association request and permitting of association provided by the 802.11g designated AP.

In addition, the AP channel 6 is an 802.11b designated AP. Therefore, when an 802.11b user type STA tries to associate with the WLAN via the AP channel 6, a STA transmits an associate request to the AP channel 6, and since the AP channel 6 is an 802.11b designated AP, then a response of yes is transmitted back to the STA. This scenario illustrates another successful association request and permitting of association provided by the 802.11b designated AP.

In general, what is shown is the selecting of first user class of STAs from among a plurality of STAs. The selection of a first user class may be viewed as being the 802.11g user class. In addition, what is shown is the selecting of a second user class of STAs from among the plurality of STAs. The selection of a second user class may be viewed as being the 802.11b user class. In addition, it is noted that each of the STAs is within range of each of the APs. Specifically in this embodiment, each of the STAs is within the range of the AP channel 1, the AP channel 6m and the AP channel 11. Moreover, what is shown is the denying STAs within the first user class of STAs from associating with a WLAN via certain AP types. Specifically, 11f user type STAs are denied from associating with an 802.11b designated AP. In addition, this illustration shows the denying of STAs within the second user class of STAs from associating with the WLAN via certain AP types. Moreover, what is shown is the allowing of STAs within the first user class to associate with the WLAN via a first AP type using a first channel. For example, 802.11b user type STAs are allowed to associate with the WLAN using either one of channel 1 and channel 6 (in this embodiment), and 802.11g user type STAs are allowed to associate with the WLAN using channel 11.

Referring to the FIG. 7, a successful association request sent by an 802.11b user type STA and a permitting of association provided by an 802.11b designated AP is shown. As with the other embodiments descried herein, the WLAN management application software may be implemented in a variety of ways. Here, the WLAN management application software is shown as being, at least partially, implemented on an 802.11b designated AP. However, the WLAN management application software may also be implemented in other ways as well as described above.

Initially, in a step 1, the 802.11b designated AP provides a beacon signaling to the STAs within its vicinity. This beacon announces the capabilities of the BSS provided by the 802.11b designated AP. Then, in a step 2, a probe request that includes an attempt by the 802.11b user type STA to associate to the WLAN is transmitted from the 802.11b user type STA to the 802.11b designated AP. In accordance with the operation of the WLAN management application software, the WLAN management application software determines whether or not the 802.11b user type STA should be permitted to associate with the WLAN using this particular 802.11b designated AP. If the 802.11b designated AP determines that the 802.11b user type STA may in fact associate with the WLAN via this particular 802.11b designated AP, then a response of yes is transmitted from the 802.11b designated AP to the 802.11b user type STA as shown in a step 3. Finally, in a step 4, effective communication/association is shown as occurring between the 802.11b designated AP and the 802.11b user type STA.

Referring to the FIG. 8, an unsuccessful association request sent by an 802.11b user type STA and a denial of association provided by an 802.11g designated AP is shown. As with the other embodiments descried herein, the WLAN management application software may be implemented in a variety of ways. Here, the WLAN management application software is shown as being, at least partially, implemented on an 802.11g designated AP. However, the WLAN management application software may also be implemented in other ways as well as described above.

Initially, in a step 1, the 802.11g designated AP provides a beacon signaling to the STAs within its vicinity. This beacon announces the capabilities of the BSS provided by the 802.11g designated AP. As a reminder, the 802.11g specification is an improvement of the 802.11b specification that includes backward compatibility, at a lower functionality set, with the 802.11b specification. Then, in a step 2, a probe request that includes an attempt by the 802.11b user type STA to associate to the WLAN is transmitted from the 802.11b user type STA to the 802.11g designated AP. In accordance with the operation of the WLAN management application software, the WLAN management application software determines whether or not the 802.11b user type STA should be permitted to associate with the WLAN using this particular 802.11g designated AP. As sown in this implementation, when the 802.11g designated AP determines that the 802.11b user type STA may not associate with the WLAN via this particular 802.11g designated AP, then a response of no is transmitted from the 802.11g designated AP to the 802.11b user type STA as shown in step 3. This may be that this 802.11g designated AP is designated only for use with 802.11g user type STAs. It is also noted here that an 802.11g designated AP may shift down its functionality to service 802.11b user type STAs as directed by the WLAN management application software; this may be required when only 802.11b user type STAs are included within the region of the WLAN, and no 802.11g user type STAs need to associate with the WLAN. Finally, in a step 4, since no effective communication/association has occurred between the 802.11b user type STA and the WLAN via this 802.11g designated AP, the 802.11b user type STA then proceeds to transmit a probe request to the next available AP to try to associate with the WLAN. The next available AP may provide a successful association/communication as shown in the FIG. 7, or a subsequent denial of association/communication may be experienced as shown here in the FIG. 8. The 802.11b user type STA will continue this process until a successful association/communication is achieved.

FIG. 9 is a diagram illustrating an embodiment of some additional parameter(s) that may be used to govern AP/STA association management according to the invention. There are a variety of types of communication channel parameters that may be employed to direct the permitting of association and the denial of association between the various STAs and the WLAN via these available APs within the WLAN.

For example, some considerations may be employed that are more STA specific. This focus may be on the capability of the STAs within the WLAN. The consideration may be between the 802.11b vs. the 802.11g functionality of the STAs. A consideration may be on the data rates (maximum, minimum, or other standard) that may be supported by the STAs. Another type of consideration may be the type of modulation employed by the STAs, be it Complementary Code Keying (CCK) modulation (which is common under the 802.11b specification) and/or the Orthogonal Frequency Division Multiplexing (OFDM) modulation (which is common under the 802.11g specification).

Another consideration may be based on the list of valid users within the WLAN vicinity. This verification/validation of which users are in fact valid users may be performed using a RADIUS server in some embodiments. The channel availability and allocation among the APs may also be a consideration. As one example referred to in some of the embodiments described above, when the channels 1, 6, and 11 are employed within an 802.11 WLAN, then a consideration of the channel availability and allocation among the APs may include what particular channels are available for the majority and/or minority user classes. As another example, there may be a situation where there are 20 users, and only a single 802.11g user type STA. In such a case, it may provide for better WLAN performance to designate all of the STAs to support the 802.11b specification to meet the needs of the other 19 802.11b user type STAs. Even though the signal 802.11g user type STA may experience reduced functionality, the overall throughput of the WLAN will be improved. This scenario represents one example of how a weighted consideration may be implemented to ensure a maximal performance of the entire WLAN.

Alternatively, it may be determined that the WLAN can support all of the 802.11b user type STAs on all but one of the available APs, and then a single 802.11g designated AP may be employed to service the single 802.11g user type STA. There are a number of ways in which WLAN management application software may be implemented to ensure a high degree of performance of the WLAN.

Similar to the considerations described above with respect to the STAs, a similar consideration may be made with respect to the APs of the WLAN. For example, some considerations may be employed that are more AP specific. This focus may be on the capability of the APs within the WLAN. The consideration may be between the 802.11b vs. the 802.11g functionality of the APs. A consideration may be on the data rates (maximum, minimum, or other standard) that may be supported by the APs. Another type of consideration may be the type of modulation employed by the APs, be it CCK modulation (which is common under the 802.11b specification) and/or the OFDM modulation (which is common under the 802.11g specification).

In addition, another consideration that may be employed is the quality of the communication links between the various STAs and the APs within the WLAN. While certain embodiments of the invention operate such that all of the STAs are within range of all of the STAs, there may be scenarios where some of the STAs are not within a sufficient range of some of the APs to achieve high signal strength. In such instances, a slighted biased (or weighted) consideration may be made as to ensure sufficient connectivity with each of the STAs to the WLAN. For example, a consideration may be to shift down its functionality from that of an 802.11g designated AP to the functionality of an 802.11b designated AP so as to ensure sufficient connectivity with an 802.11b user type STA within the WLAN.

Figure 10:
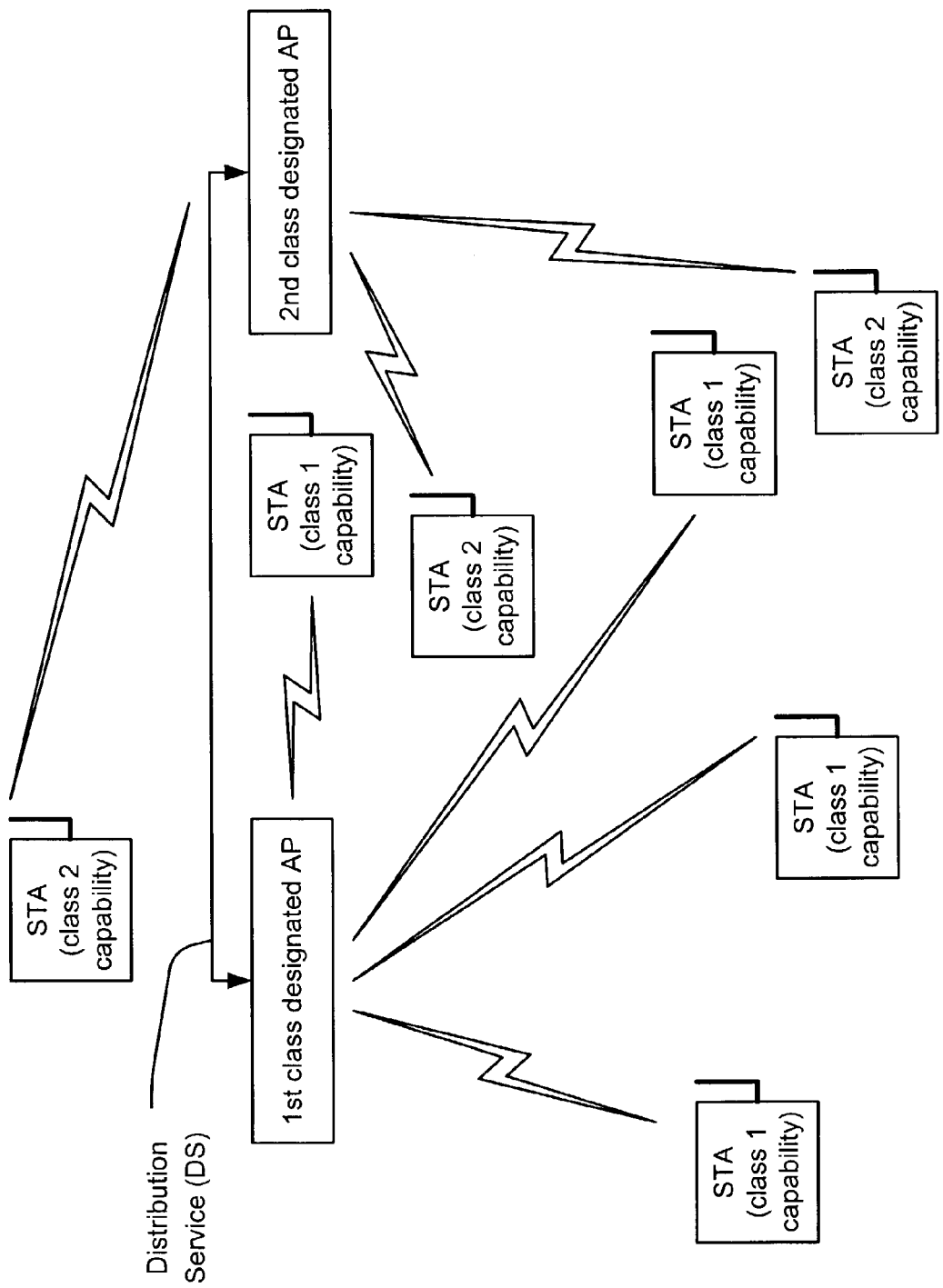
FIG. 10 is a diagram illustrating another embodiment of AP/STA association management according to the invention.

FIG. 10 is a diagram illustrating another embodiment of AP/STA association management according to the invention. This illustration shows the grouping of APs and STAs into two different class capabilities. Specifically in this embodiment, a $1^{st}$ class designated AP and a $2^{nd}$ class designated AP are communicatively coupled via a DS. The STAs within the WLAN include a number of class 1 capable STAs and a number of class 2 capable STAs. Each of the class 1 capable STAs is operable to associate with the WLAN via the $1^{st}$ class designated AP. Similarly, each of the class 2 capable STAs is operable to associate with the WLAN via the $2^{nd}$ class designated AP. Even though some of the class 1 capable STAs may be located closer to the $2^{nd}$ class designated AP, the class 1 capable STAs nevertheless are operable to associate with the WLAN via the $1^{st}$ class designated AP. By grouping all of the class 1 capable STAs with the $1^{st}$ class designated AP, and by grouping all of the class 1 capable STAs with the $2^{nd}$ class designated AP, the overall performance of the WLAN is greatly improved.

FIG. 11, FIG. 12, FIG. 13, and FIG. 14 are flowcharts illustrating different embodiments of WLAN management methods that are performed according to the invention.

Figure 11:
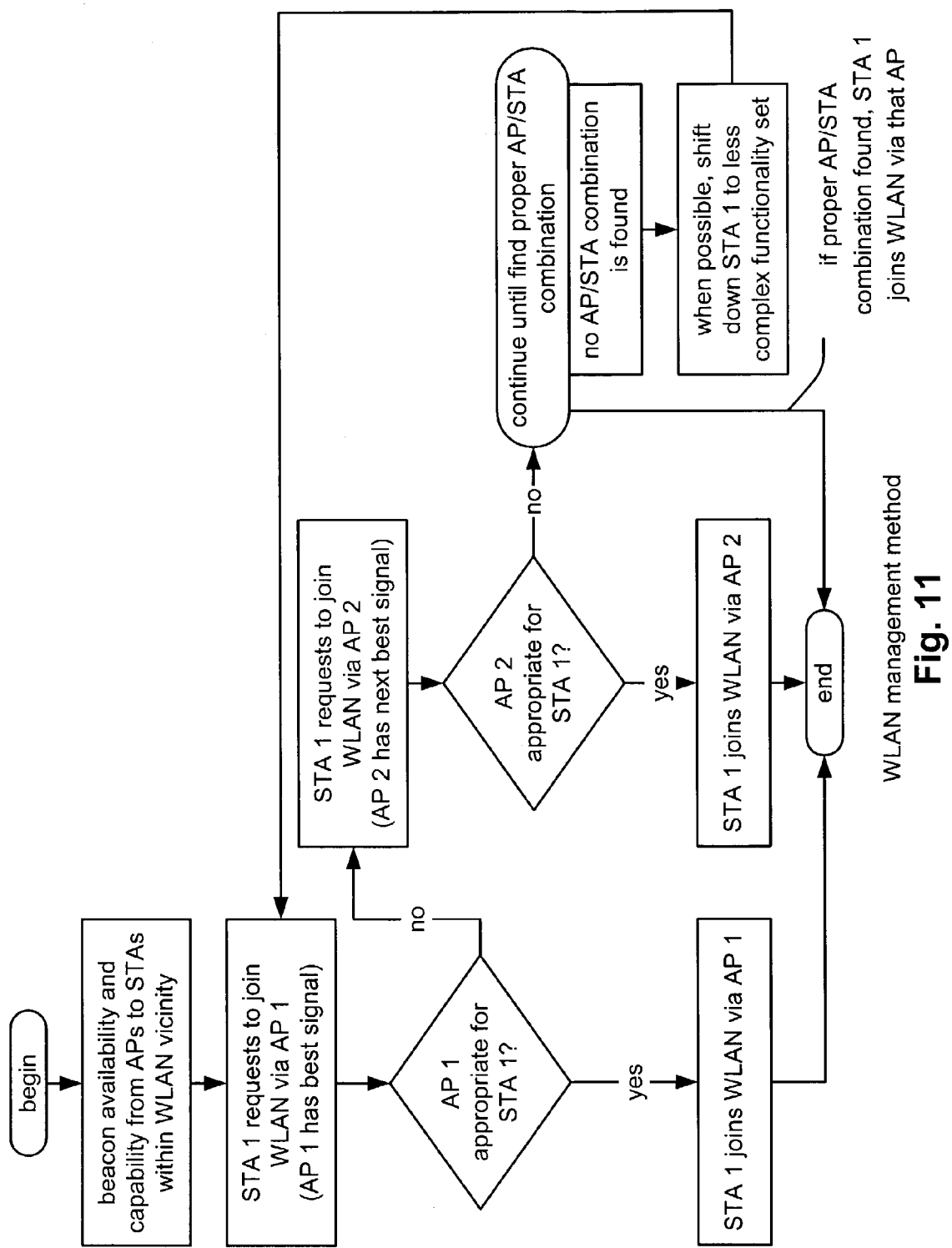
FIG. 11, FIG. 12, FIG. 13, and FIG. 14 are flowcharts illustrating different embodiments of WLAN management methods that are performed according to the invention.

Referring to the FIG. 11, initially, the capabilities of the APs within the WLAN are beaconed to the STAs within the vicinity of the WLAN. This may include beaconing the capabilities of the BSSs offered by the APs and/or the ESS offered by all of the APs corporately. Then, a STA 1 requests to join the WLAN via AP 1. This AP 1 may be initially selected since it provides the best (or strongest) signal to the STA 1 from among all of the APs. Then, it is determined in a decision block whether or not the AP 1 is appropriate for the STA 1. If the answer to this determination is yes, then the STA 1 joins the WLAN (is associated with the WLAN) via the AP 1.

However, if it is determined in the decision block that the AP 1 is not appropriate for the STA 1, then the STA 1 request to join the WLAN (to be associated with the WLAN) via an AP 2. The AP 2 may be viewed as being the AP that provides the $2^{nd}$ best (or strongest) signal to STA 1 from among all of the APs. Similar to the operation described above, it is then determined in a decision block whether or not the AP 2 is appropriate for the STA 1. If the answer to this determination is yes, then the STA 1 joins the WLAN (is associated with the WLAN) via the AP 2.

However, if it is determined in the decision block that the AP 2 is not appropriate for the STA 1, then the STA 1 requests to join the WLAN (to be associated with the WLAN) successively via the other remaining APs within the WLAN selected in order of the next best signaling provided between the STA 1 and the next AP. This process is continued until a proper AP/STA combination is found. Of such an AP/STA combination is found, then the STA 1 joins that WLAN via that particular AP.

However, if no AP/STA combination is found, then, when possible, the functionality of the STA 1 is down shifted to a less complex functionality set and the process of trying to associate with the WLAN via an AP is continued. For example, if the STA 1 is an 802.11g user type STA, and when no successful AP/STA combination may be made, then the STA 1 may shift down its functionality to that of an 802.11b user type STA and re-try to associate with the WLAN via the AP 1, AP 2, and so on as described above.

Figure 12:
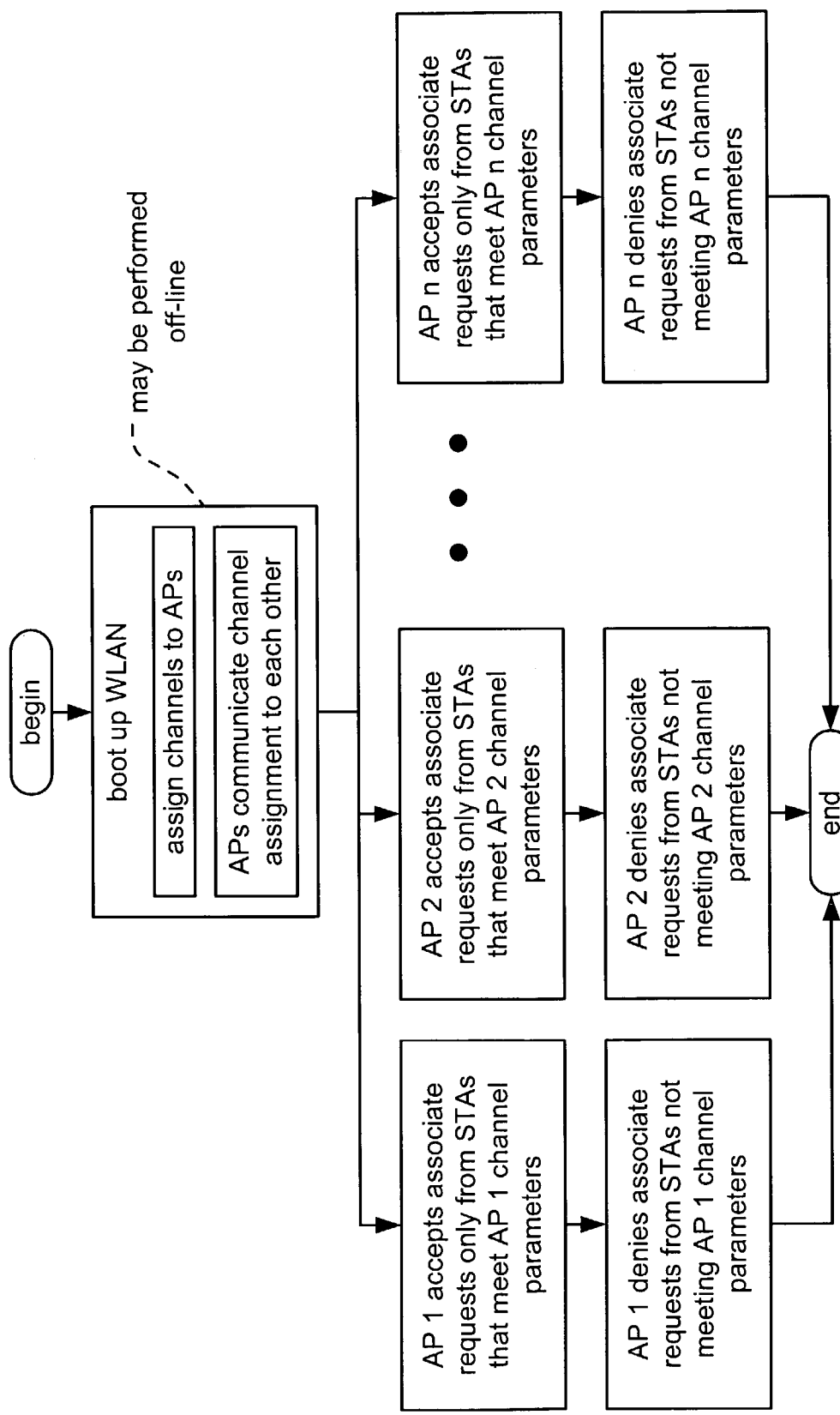

Referring to the FIG. 12, the WLAN is initially booted up. During the boot up process, the channel assignment is performed for all of the APs. As described above in one embodiment, an example of channel assignment may include assigning channel 1 to an 802.11g designated AP, channel 6 to an 802.11b designated AP, and channel 11 to an 802.11b designated AP. Other combinations may also be employed when doing this assignment. In addition, all of the APs communicate the channel assignments to one another during this boot up process. This may be performed via a DS or using a server that is communicatively coupled to each of the APs.

After the WLAN is booted up, then an AP 1 only accepts associate requests from STAs that meet the AP 1 channel parameters. The AP 1 also denies all associate requests from STAs from STAs that do not meet the AP 1 channel parameters.

Similarly, after the WLAN is booted up, then an AP 2 only accepts associate requests from STAs that meet the AP 2 channel parameters. The AP 2 also denies all associate requests from STAs from STAs that do not meet the AP 2 channel parameters.

This process of permitting and denying association requests from various STAs within the WLAN may be performed across all of the various APs within the WLAN. Assuming the WLAN includes n APs, then after the WLAN is booted up, an AP n only accepts associate requests from STAs that meet the AP n channel parameters. The AP n also denies all associate requests from STAs from STAs that do not meet the AP n channel parameters.

It is also noted here that the WLAN may change its channel assignments over time. For example, during the initial boot up, the APs within the WLAN may have a first channel assignment. Then, after a period of time, the operational state of the WLAN may have changed (e.g., new STAs joining the WLAN, other STAs leaving the WLAN, different throughput requirements, and so on) and the channel assignment may need to be modified. For example using one simple scenario, if the number of 802.11g user type STAs is greater than the number of 802.11b user type STAs during boot up, then a fewer number of channels may need to be employed to service the 802.11b user type STAs than the 802.11g user type STAs. However, it over time, some of the 802.11g user type STAs leave the WLAN, and more 802.11b user type STAs joint the WLAN, then perhaps more channels need to be switched to meet the needs of the increased number of increased number of 802.11b user type STAs. Clearly, fewer channels would probably be needed to meet the needs of the decreased number of increased number of 802.11g user type STAs. This described just one simple situation where a channel re-assignment may need to be performed. Clearly, other scenarios may also justify changing the channel assignment over time without departing from the scope and spirit of the invention.

Figure 13:
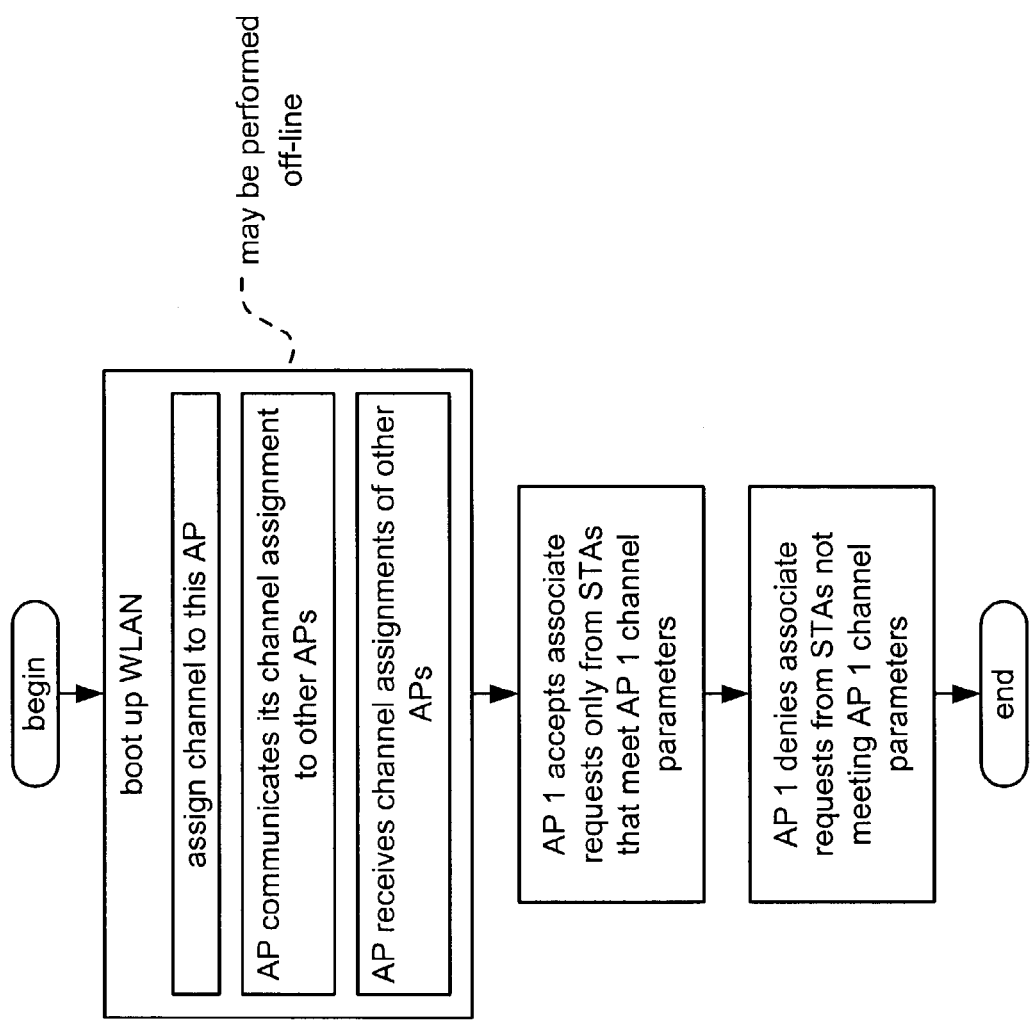

Referring to the FIG. 13, this shows the operation seen at a singular AP within the WLAN. Similar to the embodiment described above, during the boot up process, the channel assignment is performed for all of the APs. More specifically, this AP receives its channel assignment during this step, and its channel assignment is also communicated to the other APs within the WLAN. In addition, this AP receives the channel assignments of the other APs within the WLAN.

After the WLAN is booted up, then this AP 1 only accepts associate requests from STAs that meet its AP 1 channel parameters. The AP 1 also denies all associate requests from STAs from STAs that do not meet the AP 1 channel parameters.

Again, this embodiment shows the functionality and interaction between a single AP and a single STA. Other embodiments show the interaction between all of the APs and all of the STAs within the entire WLAN.

Figure 14:
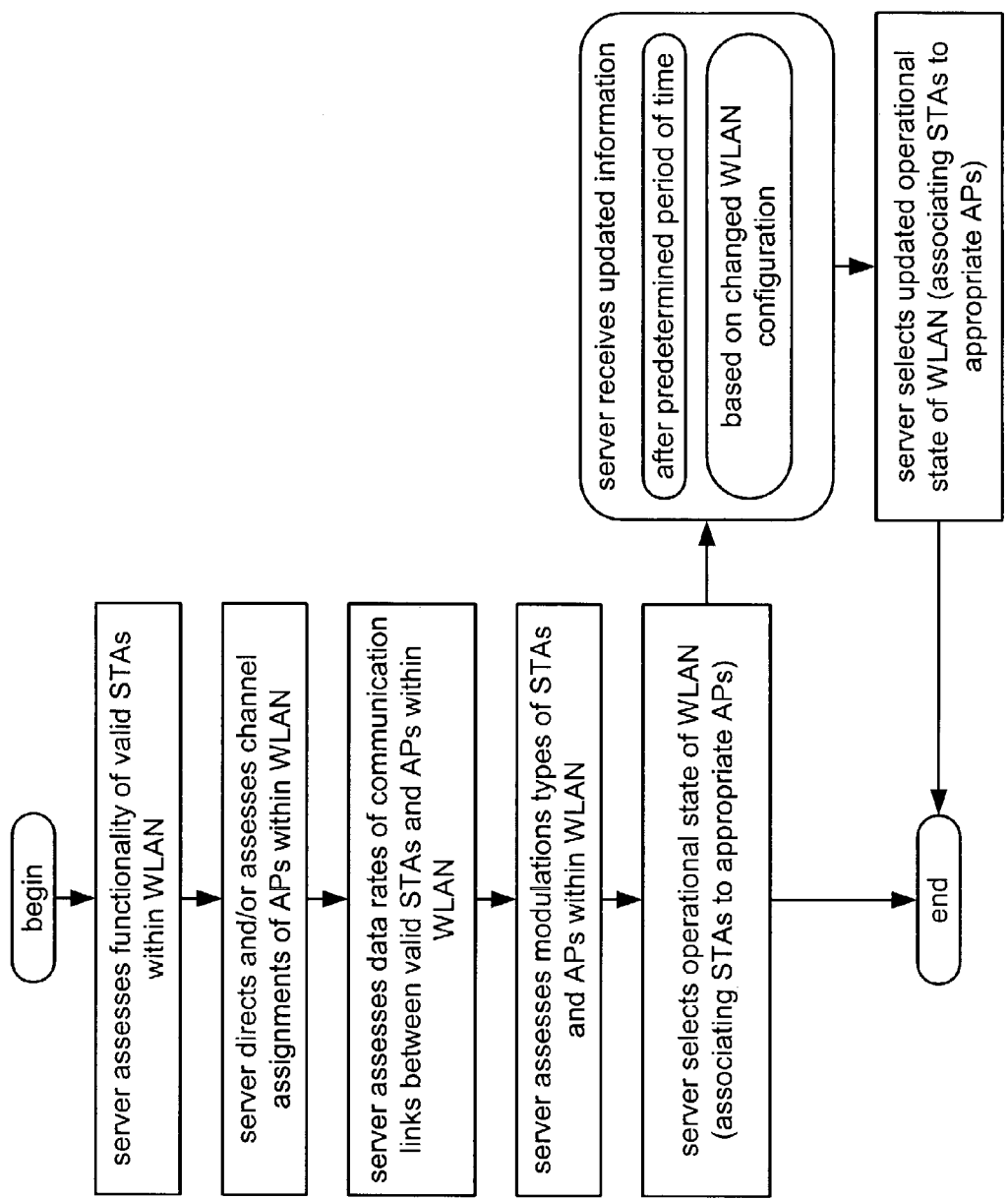

Referring to the FIG. 14, a server assesses the functionality of the valid STAs within a WLAN. Then, the server directs and/or assesses the channel assignments of the APs within the WLAN. The server then assesses the data rates of the various communication links between the valid STAs and the APs within the WLAN. The server then assesses the modulation types of the STAs and the APs within the WLAN.

Based upon all of this assessment and/or directing described above, the server will then select an appropriate operational state of the WLAN that effectively associates the STAs with the appropriate APs.

If and when the server receives updated information, then the server may then select an updated, appropriate operational state of the WLAN that effectively associates the STAs with the appropriate APs according to these new conditions. The server may receive this updated information after a predetermined period of time and/or base upon changed WLAN configuration. This changed WLAN configuration may include various types of users joining and/or leaving the WLAN.

Figure 15:
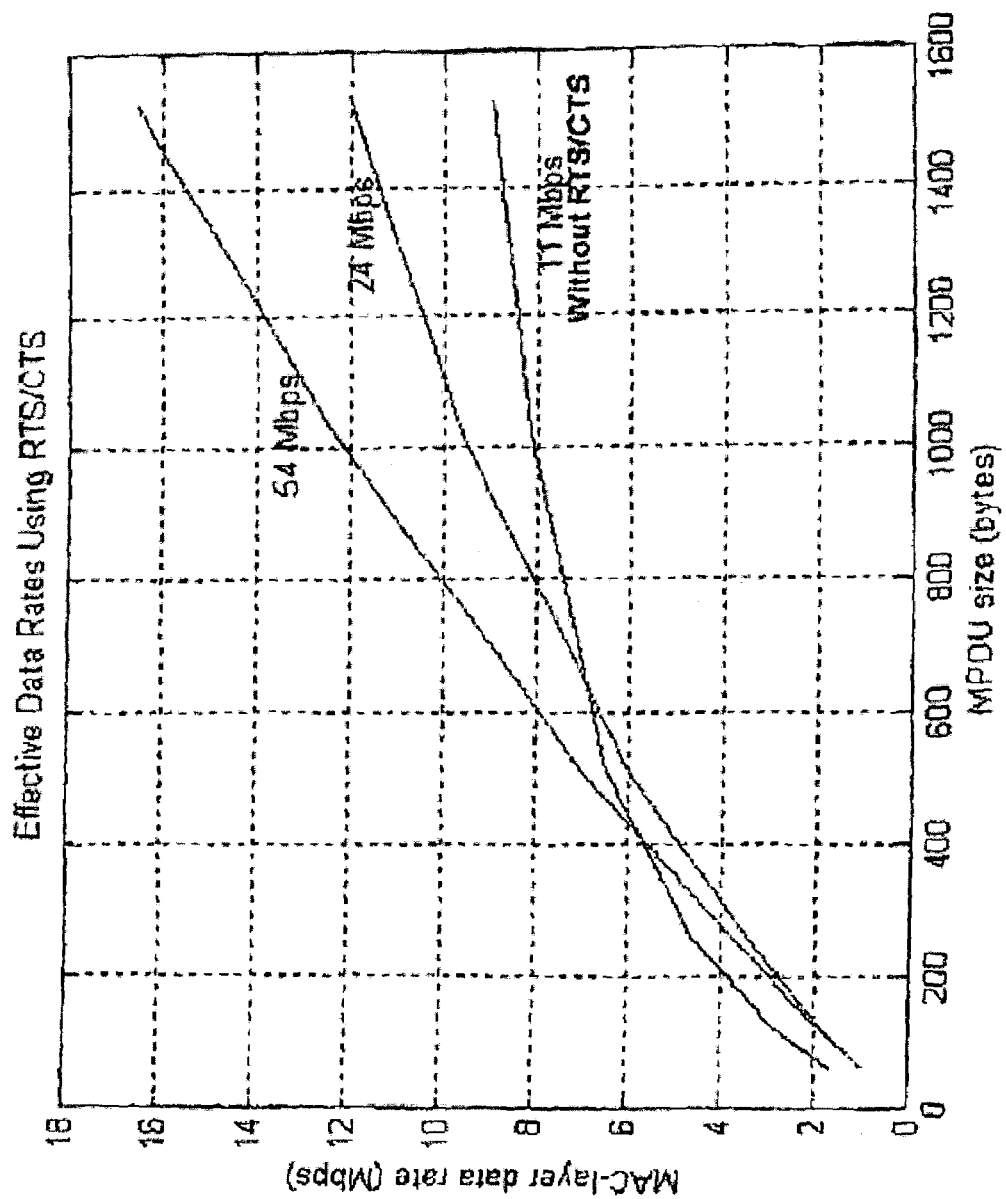
FIG. 15 is a diagram illustrating comparative effective data rates that may be achieved when RTS/CTS (Ready to Send/Clear to Send) is (and is not) employed within a WLAN that employs the WLAN management according to the invention.

FIG. 15 is a diagram illustrating comparative effective data rates that may be achieved when RTS/CTS (Request to Send/Clear to Send) is (and is not) employed within a WLAN that employs the WLAN management according to the invention. This figure illustrates one of the many ancillary benefits of the invention. As an optional feature, the IEEE 802.11 specification standard includes the RTS/CTS (Request to Send/Clear to Send) function to control station access to the WLAN.

When RTS/CTS is enabled on a particular STA, that STA refrains from sending a data frame until the STA completes a RTS/CTS handshake with the AP. A STA initiates the process by sending a RTS frame. The AP receives the RTS and responds with a CTS frame. The STA must receive a CTS frame before sending the data frame. The CTS also contains a time value that alerts other STAs to hold off from accessing the WLAN while the STA initiating the RTS transmits its data.

The RTS/CTS handshaking provides positive control over the use of the shared medium of the WLAN. The primary reason for implementing RTS/CTS is to minimize collisions among hidden STAs. This may undesirably occur when STAs and APs are spread out throughout the facility and a relatively high number of retransmissions are occurring on the WLAN.

While RTS/CTS presents one solution to try to avoid collisions within the WLAN, it is also noted that RTS/CTS does nevertheless have a dramatic and severe impact on actual throughput within the WLAN. One of the many ancillary benefits of the invention is that the RTS/CTS mechanism need not be turned on at all. That is to say, the invention provides a WLAN management approach that obviates the need for the RTS/CTS mechanism.

In view of the above detailed description of the invention and associated drawings, other modifications and variations will now become apparent. It should also be apparent that such other modifications and variations may be effected without departing from the spirit and scope of the invention.

What is claimed is:

1. A Wireless Local Area Network (WLAN) management method, the method comprising:
   selecting a first user class of wireless stations (STAs) from among a plurality of STAs;
   selecting a second user class of STAs from among the plurality of STAs;
   wherein each STA within the plurality of STAs is within range of a first Access Point (AP) and a second AP;
   denying STAs within the first user class of STAs from associating with a WLAN via the second AP;
   denying STAs within the second user class of STAs from associating with the WLAN via the first AP;
   allowing STAs within the first user class of STAs to associate with the WLAN via the first AP using a first channel; and
   allowing STAs within the second user class of STAs to associate with the WLAN via the second AP using a second channel.

2. The method of claim 1, wherein:
   the first user class of STAs includes Institute of Electrical & Electronics Engineers (IEEE) 802.11b specification operable STAs; and
   the second user class of STAs includes IEEE 802.11g specification operable STAs.

3. The method of claim 1, wherein:
   the first channel that supports communication with the WLAN between the first user class of STAs and the first AP includes at least one of channel 1 and channel 6 within the Institute of Electrical & Electronics Engineers (IEEE) 802.11 specification; and
   the second channel that supports communication with the WLAN between the second user class of STAs and the second AP includes channel 11 within the IEEE 802.11 specification.

4. The method of claim 1, wherein:
   the first AP is an Institute of Electrical & Electronics Engineers (IEEE) 802.11b specification operable AP; and
   the second AP is an IEEE 802.11g specification operable AP.

5. The method of claim 1, wherein the STAs within at least one of the first class of STAs and the second class of STAs include at least one common channel parameter that is selected from Institute of Electrical & Electronics Engineers (IEEE) 802.11b specification functionality, IEEE 802.11g specification functionality, a modulation type selected from Complementary Code Keying (CCK) and Orthogonal Frequency Division Multiplexing (OFDM), a data rate, and a quality of wireless communication link between the STAs and at least one of the first AP and the second AP.

6. The method of claim 1, wherein the first AP and the second AP are communicatively coupled to a server that includes WLAN management application software that directs the denial and the association of STAs within the first class of STAs and the second class of STAs with the first AP and the second AP.

7. The method of claim 1, wherein:
the first AP and the second AP are communicatively coupled via a Distribution Service (DS) link;
the first AP includes a first WLAN management application software;
the second AP includes a second WLAN management application software; and
the first WLAN management application software and the second WLAN management application software operate cooperatively to direct the denial and the association of STAs within the first class of STAs and the second class of STAs with the first AP and the second AP.

8. The method of claim 1, wherein the second user class of STAs within the plurality of STAs is automatically selected as being a remaining plurality of STAs within the plurality of STAs not selected during the selecting of the first user class of STAs from among the plurality of STAs.

9. The method of claim 1, wherein the first AP beacons capabilities of a first Basic Service Set (BSS) to each STA within the plurality of STAs.

10. The method of claim 9, wherein:
the second AP beacons capabilities of a second BSS to each STA within the plurality of STAs; and
the capabilities of the first BSS and the second BSS compose an Extended Service Set (ESS).

11. The method of claim 1, further comprising initially transmitting a first associate request from a STA within the plurality of STAs to the first AP when a signal strength between the STA and the first AP is greater than a signal strength between the STA and the second AP.

12. The method of claim 11, further comprising subsequently transmitting a second associate request from the STA to the second AP when the STA is denied association with the first AP.

13. The method of claim 12, further comprising:
shifting down functionality of the STA when the STA is denied association with both the first AP and the second AP; and
transmitting a third associate request from the STA to the first AP.

14. The method of claim 1, further comprising:
informing the second AP of the association when at least one STA within the first user class of STAs associates with the first AP; and
informing the first AP of the association when at least one STA within the second user class of STAs associates with the second AP.

15. The method of claim 1, wherein the WLAN is communicatively coupled to a Wide Area Network (WAN).

16. A Wireless Local Area Network (WLAN) management method, the method comprising:
selecting a first user class of wireless stations (STAs) from among a plurality of STAs;
selecting a second user class of STAs from among the plurality of STAs;
wherein each STA within the plurality of STAs is within range of a first Access Point (AP) and a second AP;
denying STAs within the first user class of STAs from associating with a WLAN via the second AP;
denying STAs within the second user class of STAs from associating with the WLAN via the first AP;
allowing STAs within the first user class of STAs to associate with the WLAN via the first AP using a first channel; and
allowing STAs within the second user class of STAs to associate with the WLAN via the second AP using a second channel;
initially transmitting a first associate request from a STA within the plurality of STAs to the first AP when a signal strength between the STA and the first AP is greater than a signal strength between the STA and the second AP;
subsequently transmitting a second associate request from the STA to the second AP when the STA is denied association with the first AP;
shifting down functionality of the STA when the STA is denied association with both the first AP and the second AP;
transmitting a third associate request from the STA to the first AP;
informing the second AP of the association when at least one STA within the first user class of STAs associates with the first AP;
informing the first AP of the association when at least one STA within the second user class of STAs associates with the second AP.

17. The method of claim 16, wherein:
the first user class of STAs includes Institute of Electrical & Electronics Engineers (IEEE) 802.11b specification operable STAs; and
the second user class of STAs includes IEEE 802.11g specification operable STAs.

18. The method of claim 16, wherein:
the first channel that supports communication with the WLAN between the first user class of STAs and the first AP includes at least one of channel 1 and channel 6 within the Institute of Electrical & Electronics Engineers (IEEE) 802.11 specification; and
the second channel that supports communication with the WLAN between the second user class of STAs and the second AP includes channel 11 within the IEEE 802.11 specification.

19. The method of claim 16, wherein:
the first AP is an Institute of Electrical & Electronics Engineers (IEEE) 802.11b specification operable AP; and
the second AP is an IEEE 802.11g specification operable AP.

20. The method of claim 16, wherein the STAs within at least one of the first class of STAs and the second class of STAs include at least one common channel parameter that is selected from Institute of Electrical & Electronics Engineers (IEEE) 802.11b specification functionality, IEEE 802.11g specification functionality, a modulation type selected from Complementary Code Keying (CCK) and Orthogonal Frequency Division Multiplexing (OFDM), a data rate, and a quality of wireless communication link between the STAs and at least one of the first AP and the second AP.

21. The method of claim 16, wherein the first AP and the second AP are communicatively coupled to a server that includes WLAN management application software that directs the denial and the association of STAs within the first class of STAs and the second class of STAs with the first AP and the second AP.

22. The method of claim 16, wherein:
the first AP and the second AP are communicatively coupled via a Distribution Service (DS) link;
the first AP includes a first WLAN management application software;
the second AP includes a second WLAN management application software; and
the first WLAN management application software and the second WLAN management application software operate cooperatively to direct the denial and the association of STAs within the first class of STAs and the second class of STAs with the first AP and the second AP.

23. The method of claim 16, wherein the second user class of STAs within the plurality of STAs is automatically selected as being a remaining plurality of STAs within the plurality of STAs not selected during the selecting of the first user class of STAs from among the plurality of STAs.

24. The method of claim 16, wherein the first AP beacons capabilities of a first Basic Service Set (BSS) to each STA within the plurality of STAs.

25. The method of claim 24, wherein:
the second AP beacons capabilities of a second BSS to each STA within the plurality of STAs; and
the capabilities of the first BSS and the second BSS compose an Extended Service Set (ESS).

26. A Wireless Local Area Network (WLAN) management method, the method comprising:
beaconing availability and capability from a first Access Point (AP) within a WLAN to a plurality of valid wireless stations (STAs);
beaconing availability and capability from a second AP within the WLAN to the plurality of STAs;
transmitting a first associate request from a STA within the plurality of STAs to the first AP when a signal strength between the STA and the first AP is greater than a signal strength between the STA and the second AP;
determining whether the STA is appropriate for association with the first AP by identifying at least one common channel parameter between the STA and the first AP;
associating the STA with the WLAN via the first AP using a first channel when the STA and the first AP share at least one common channel parameter;
denying the STA from associating with the WLAN via the first AP when the STA and the first AP do not share at least one common channel parameter;
transmitting a second associate request from the STA within the plurality of STAs to the second AP when the STA is denied association with the first AP;
associating the STA with the WLAN via the second AP using a second channel when the STA and the second AP share at least one common channel parameter;
denying the STA from associating with the WLAN via the second AP when the STA and the second AP do not share at least one common channel parameter;
shifting down functionality of the STA when the STA is denied association with both the first AP and the second AP;
transmitting a third associate request from the down-shifted functionality STA within the plurality of STAs to the first AP;
associating the down-shifted functionality STA with the WLAN via the first AP using the first channel when the down-shifted functionality STA and the first AP share at least one common channel parameter; and
denying the down-shifted functionality STA from associating with the WLAN via the first AP when the down-shifted functionality STA and the first AP do not share at least one common channel parameter.

27. The method of claim 26, wherein the at least one common channel parameter is selected from Institute of Electrical & Electronics Engineers (IEEE) 802.11b specification functionality, IEEE 802.11g specification functionality, a modulation type selected from Complementary Code Keying (CCK) and Orthogonal Frequency Division Multiplexing (OFDM), a data rate, and a quality of wireless communication link between the STAs and at least one of the first AP and the second AP.

28. The method of claim 26, wherein:
the STA within the plurality of STAs includes Electrical & Electronics Engineers (IEEE) 802.11g specification functionality; and
down-shifted functionality STA the plurality of STAs includes IEEE 802.11b specification functionality.

29. The method of claim 26, wherein the first AP and the second AP are communicatively coupled to a server that includes WLAN management application software that directs the denial and the association of the STA with the first AP or the second AP.

30. The method of claim 26, wherein the first AP and the second AP are communicatively coupled via a Distribution Service (DS) link;
the first AP includes a first WLAN management application software;
the second AP includes a second WLAN management application software; and
wherein the first WLAN management application software and the second WLAN management application software operate cooperatively to direct the denial and the association of STA with the first AP and the second AP.

31. A Wireless Local Area Network (WLAN) communication system, the system comprising:
a first Access Point (AP) that allows wireless stations (STAs) within a first user class of STAs to associate with a WLAN using a first channel;
wherein STAs within a second user class of STAs are denied association with the WLAN via the first AP;
a second AP that allows STAs within the second class of STAs to associate with the WLAN using a second channel;
wherein STAs within the first user class of STAs are denied association with the WLAN via the second AP;
wherein each STA within the plurality of STAs is within range of the first AP and the second AP; and
a server that is communicatively coupled the first AP and the second AP;
wherein the server includes WLAN management application software that directs the denial and the association of STAs within the first class of STAs and the second class of STAs with the first AP and the second AP.

32. The system of claim 31, wherein:
the first user class of STAs includes Institute of Electrical & Electronics Engineers (IEEE) 802.11b specification operable STAs; and
the second user class of STAs includes IEEE 802.11g specification operable STAs.

33. The method of claim 31, wherein:
the first AP is an Institute of Electrical & Electronics Engineers (IEEE) 802.11b specification operable AP; and the second AP is an IEEE 802.11g specification operable AP.

34. The system of claim 31, wherein:
the first channel that supports communication with the WLAN between the first user class of STAs and the first AP includes at least one of channel 1 and channel 6 within the Institute of Electrical & Electronics Engineers (IEEE) 802.11 specification; and
the second channel that supports communication with the WLAN between the second user class of STAs and the second AP includes channel 11 within the IEEE 802.11 specification.

35. The system of claim 31, wherein the STAs within at least one of the first class of STAs and the second class of STAs include at least one common channel parameter that is selected from Institute of Electrical & Electronics Engineers (IEEE) 802.11b specification functionality, IEEE 802.11g specification functionality, a modulation type selected from Complementary Code Keying (CCK) and Orthogonal Frequency Division Multiplexing (OFDM), a data rate, and a quality of wireless communication link between the STAs and at least one of the first AP and the second AP.

36. The system of claim 31, wherein:
the first AP beacons capabilities of a first Basic Service Set (BSS) to each STA within the plurality of STAs;
the second AP beacons capabilities of a second BSS to each STA within the plurality of STAs; and
the capabilities of the first BSS and the second BSS compose an Extended Service Set (ESS).

37. The system of claim 31, wherein:
the first STA initially transmits a first associate request to the first AP when a signal strength between the first STA and the first AP is greater than a signal strength between the first STA and the second AP;
the first STA subsequently transmits a second associate request from the first STA to the second AP when the first STA is denied association with the first AP.

38. The system of claim 37, wherein:
functionality of the first STA is shifted down when the first STA is denied association with both the first AP and the second AP; and
the first STA transmits a third associate request from the first STA to the first AP.

39. The system of claim 31, wherein:
the first AP informs the second AP of the association when at least one STA within the first user class of STAs associates with the first AP; and
the second AP informs the first AP of the association when at least one STA within the second user class of STAs associates with the second AP.

40. The system of claim 31, wherein the WLAN is communicatively coupled to a Wide Area Network (WAN).

41. A Wireless Local Area Network (WLAN) communication system, the system comprising:
a first Access Point (AP) that allows wireless stations (STAs) within a first user class of STAs to associate with a WLAN using a first channel;
wherein STAs within a second user class of STAs are denied association with the WLAN via the first AP;
a second AP that allows STAs within the second class of STAs to associate with the WLAN using a second channel;
wherein STAs within the first user class of STAs are denied association with the WLAN via the second AP;
wherein each STA within the plurality of STAs is within range of the first AP and the second AP; and
a Distribution Service (DS) link that is communicatively coupled to the first AP and to the second AP;
wherein the first AP includes a first WLAN management application software;
wherein the second AP includes a second WLAN management application software; and
wherein the first WLAN management application software and the second WLAN management application software operate cooperatively to direct the denial and the association of STAs within the first class of STAs and the second class of STAs with the first AP and the second AP.

42. The system of claim 41, wherein:
the first user class of STAs includes Institute of Electrical & Electronics Engineers (IEEE) 802.11b specification operable STAs; and
the second user class of STAs includes IEEE 802.11g specification operable STAs.

43. The system of claim 41, wherein:
the first AP is an Institute of Electrical & Electronics Engineers (IEEE) 802.11b specification operable AP; and
the second AP is an IEEE 802.11g specification operable AP.

44. The system of claim 41, wherein:
the first channel that supports communication with the WLAN between the first user class of STAs and the first AP includes at least one of channel 1 and channel 6 within the Institute of Electrical & Electronics Engineers (IEEE) 802.11 specification; and
the second channel that supports communication with the WLAN between the second user class of STAs and the second AP includes channel 11 within the IEEE 802.11 specification.

45. The system of claim 41, wherein the STAs within at least one of the first class of STAs and the second class of STAs include at least one common channel parameter that is selected from Institute of Electrical & Electronics Engineers (IEEE) 802.11b specification functionality, IEEE 802.11g specification functionality, a modulation type selected from Complementary Code Keying (CCK) and Orthogonal Frequency Division Multiplexing (OFDM), a data rate, and a quality of wireless communication link between the STAs and at least one of the first AP and the second AP.

46. The system of claim 41, wherein:
the first AP beacons capabilities of a first Basic Service Set (BSS) to each STA within the plurality of STAs;
the second AP beacons capabilities of a second BSS to each STA within the plurality of STAs; and
the capabilities of the first BSS and the second BSS compose an Extended Service Set (ESS).

47. The system of claim 41, wherein:
the first STA initially transmits a first associate request to the first AP when a signal strength between the first STA and the first AP is greater than a signal strength between the first STA and the second AP;
the first STA subsequently transmits a second associate request from the first STA to the second AP when the first STA is denied association with the first AP.

48. The system of claim 47, wherein:
functionality of the first STA is shifted down when the first STA is denied association with both the first AP and the second AP; and
the first STA transmits a third associate request from the first STA to the first AP.

49. The system of claim 41, wherein:
the first AP informs the second AP of the association when at least one STA within the first user class of STAs associates with the first AP; and
the second AP informs the first AP of the association when at least one STA within the second user class of STAs associates with the second AP.

50. The system of claim 41, wherein the WLAN is communicatively coupled to a Wide Area Network (WAN).

51. A Wireless Local Area Network (WLAN) communication system, the system comprising:
a first Access Point (AP) that allows wireless stations (STAs) within a first user class of STAs to associate with a WLAN using a first channel;
wherein STAs within a second user class of STAs are denied association with the WLAN via the first AP;
a second AP that allows STAs within the second class of STAs to associate with the WLAN using a second channel;
wherein STAs within the first user class of STAs are denied association with the WLAN via the second AP;
wherein each STA within the plurality of STAs is within range of the first AP and the second AP; and
a server that is communicatively coupled the first AP and the second AP;
wherein the first AP includes a first WLAN management application software;
wherein the second AP includes a second WLAN management application software;
wherein the server includes a third WLAN management application software that directs the denial and the association of STAs within the first class of STAs and the second class of STAs with the first AP and the second AP; and
wherein the first WLAN management application software, the second WLAN management application software, and the third WLAN management application software operate cooperatively to direct the denial and the association of STAs within the first class of STAs and the second class of STAs with the first AP and the second AP.

52. The system of claim 51, wherein:
the first user class of STAs includes Institute of Electrical & Electronics Engineers (IEEE) 802.11b specification operable STAs; and
the second user class of STAs includes IEEE 802.11g specification operable STAs.

53. The system of claim 51, wherein:
the first AP is an Institute of Electrical & Electronics Engineers (IEEE) 802.11b specification operable AP; and
the second AP is an IEEE 802.11g specification operable AP.

54. The system of claim 51, wherein:
the first channel that supports communication with the WLAN between the first user class of STAs and the first AP includes at least one of channel 1 and channel 6 within the Institute of Electrical & Electronics Engineers (IEEE) 802.11 specification; and
the second channel that supports communication with the WLAN between the second user class of STAs and the second AP includes channel 11 within the IEEE 802.11 specification.

55. The system of claim 51, wherein the STAs within at least one of the first class of STAs and the second class of STAs include at least one common channel parameter that is selected from Institute of Electrical & Electronics Engineers (IEEE) 802.11b specification functionality, IEEE 802.11g specification functionality, a modulation type selected from Complementary Code Keying (CCK) and Orthogonal Frequency Division Multiplexing (OFDM), a data rate, and a quality of wireless communication link between the STAs and at least one of the first AP and the second AP.

56. The system of claim 51, wherein:
the first AP beacons capabilities of a first Basic Service Set (BSS) to each STA within the plurality of STAs;
the second AP beacons capabilities of a second BSS to each STA within the plurality of STAs; and
the capabilities of the first BSS and the second BSS compose an Extended Service Set (ESS).

57. The system of claim 51, wherein:
the first STA initially transmits a first associate request to the first AP when a signal strength between the first STA and the first AP is greater than a signal strength between the first STA and the second AP;
the first STA subsequently transmits a second associate request from the first STA to the second AP when the first STA is denied association with the first AP.

58. The system of claim 57, wherein:
functionality of the first STA is shifted down when the first STA is denied association with both the first AP and the second AP; and
the first STA transmits a third associate request from the first STA to the first AP.

59. The system of claim 51, wherein:
the first AP informs the second AP of the association when at least one STA within the first user class of STAs associates with the first AP; and
the second AP informs the first AP of the association when at least one STA within the second user class of STAs associates with the second AP.

60. The system of claim 51, wherein the WLAN is communicatively coupled to a Wide Area Network (WAN).

* * * * *